United States Patent
Stott

(10) Patent No.: US 12,552,733 B2
(45) Date of Patent: *Feb. 17, 2026

(54) TERPENOPHENOLIC COMPOUNDS AND THEIR USE

(71) Applicant: Phytotherapeutix Ltd., Chester (GB)

(72) Inventor: Colin George Stott, Merseyside (GB)

(73) Assignee: Phytotherapeutix Limited (GB)

( * ) Notice: Subject to any disclaimer, the term of this patent is extended or adjusted under 35 U.S.C. 154(b) by 371 days.

This patent is subject to a terminal disclaimer.

(21) Appl. No.: 17/916,494

(22) PCT Filed: Mar. 31, 2021

(86) PCT No.: PCT/GB2021/050812
§ 371 (c)(1),
(2) Date: Sep. 30, 2022

(87) PCT Pub. No.: WO2021/198692
PCT Pub. Date: Oct. 7, 2021

(65) Prior Publication Data
US 2023/0227390 A1 Jul. 20, 2023

Related U.S. Application Data

(60) Provisional application No. 63/003,270, filed on Mar. 31, 2020.

(51) Int. Cl.
*C07C 39/23* (2006.01)
*A61K 31/05* (2006.01)
*A61K 31/105* (2006.01)
*A61P 25/08* (2006.01)

(52) U.S. Cl.
CPC .............. *C07C 39/23* (2013.01); *A61K 31/05* (2013.01); *A61P 25/08* (2018.01); *C07B 2200/09* (2013.01); *C07C 2601/16* (2017.05)

(58) Field of Classification Search
CPC ........ C07C 39/23; A61P 25/08; A61K 31/105
See application file for complete search history.

(56) References Cited

U.S. PATENT DOCUMENTS

| | | | |
|---|---|---|---|
| 7,759,526 B2 * | 7/2010 | Mechoulam | A61P 25/18 568/619 |
| 8,293,786 B2 * | 10/2012 | Stinchcomb | A61P 1/02 514/483 |
| 2019/0023680 A1 | 1/2019 | Leahy | |

FOREIGN PATENT DOCUMENTS

| | | |
|---|---|---|
| EP | 2314580 A1 | 4/2011 |
| WO | 2014177593 A1 | 11/2014 |
| WO | 2017011210 A1 | 1/2017 |
| WO | 2017181118 A1 | 10/2017 |
| WO | 2017216362 A1 | 12/2017 |
| WO | 2020041326 A1 | 2/2020 |
| WO | 2020232545 A1 | 11/2020 |

OTHER PUBLICATIONS

Leslie W. Crombie et al. "Synthesis of bibenzyl cannabinoids, hybrids of two biogenetic series found in Cannabis sativa" Journal of the Chemical Society, Perkin Transactions 1, No. 5 Jan. 1, 1988, pp. 1263-1270.

* cited by examiner

*Primary Examiner* — Sikarl A Witherspoon
(74) *Attorney, Agent, or Firm* — Fishman Stewart PLLC

(57) ABSTRACT

The present disclosure describes terpenophenolic compounds and their use in medicine. The present disclosure further describes perrottetinene-like compounds, the manufacture thereof, formulations containing same and their use in medicine. Such compounds include (1'R, 2'R)-5'-methylphenethyl-2'-(prop-1-ene-2-yl)-1', 2', 3, 4'-tetrahydro-[1, 1-biphenyl]-2,6-diol (CBD-PET) or (1'R,2'R)-4-(4-hydroxyphenethyl)-5'-methyl-2'-(prop-1-ene-2-yl)-1', 2', 3, 4'-tetrahydro-[1, 1'-biphenyl]-2,6-diol (CBD-PET-OH).

22 Claims, 13 Drawing Sheets

(-)-trans-CBD-PET (1'R,2'R)-5'-methyl-4-phenethyl-2'-(prop-1-en-2-yl)-1',2',3',4'-tetrahydro-[1,1'-biphenyl]-2,6-diol (+)-trans-CBD-PET (1'S,2'S)-5'-methyl-4-phenethyl-2'-(prop-1-en-2-yl)-1',2',3',4'-tetrahydro-[1,1'-biphenyl]-2,6-diol (-)-cis-CBD-PET (1'R,2'S)-5'-methyl-4-phenethyl-2'-(prop-1-en-2-yl)-1',2',3',4'-tetrahydro-[1,1'-biphenyl]-2,6-diol (+)-cis-CBD-PET (1'S,2'R)-5'-methyl-4-phenethyl-2'-(prop-1-en-2-yl)-1',2',3',4'-tetrahydro-[1,1'-biphenyl]-2,6-diol 5'-methyl-4-phenethyl-2'-(prop-1-en-2-yl)-1',2',3',4'-tetrahydro-[1,1'-biphenyl]-2,6-diol (-)-trans-CBD-PET-OH (1'R,2'R)-4-(4-hydroxyphenethyl)-5'-methyl-2'-(prop-1-en-2-yl)-1',2',3',4'-tetrahydro-[1,1'-biphenyl]-2,6-diol (+)-trans-CBD-PET-OH (1'S,2'S)-4-(4-hydroxyphenethyl)-5'-methyl-2'-(prop-1-en-2-yl)-1',2',3',4'-tetrahydro-[1,1'-biphenyl]-2,6-diol (-)-cis-CBD-PET-OH (1'R,2'S)-4-(4-hydroxyphenethyl)-5'-methyl-2'-(prop-1-en-2-yl)-1',2',3',4'-tetrahydro-[1,1'-biphenyl]-2,6-diol (1'S,2'R)-4-(4-hydroxyphenethyl)-5'-methyl-2'-(prop-1-en-2-yl)-1',2',3',4'-tetrahydro-[1,1'-biphenyl]-2,6-diol 4-(4-hydroxyphenethyl)-5'-methyl-2'-(prop-1-en-2-yl)-1',2',3',4'-tetrahydro-[1,1'-biphenyl]-2,6-diol

TERPENOPHENOLIC COMPOUNDS AND THEIR USE

CROSS-REFERENCE TO RELATED APPLICATIONS

This application claims priority to International Application No. PCT/GB2021/050812, filed on Mar. 31, 2021, and US Provisional Patent Application. 63/003,270 filed on Mar. 31, 2020, the contents of both are hereby incorporated by reference in their entirety.

FIELD OF THE INVENTION

This invention relates to terpenophenolic compounds and their use in medicine. More particularly it relates to perrottetinene-like compounds, the manufacture thereof, formulations containing same and their use in medicine.

BACKGROUND TO THE INVENTION

Perrottetinene (PET) is a naturally occurring compound found in liverworts from the genus Radula native to Japan, New Zealand and Costa Rica, namely Radula perrottrtii, Radula marginataz and Radula laxiramea.

It is a terpenophenolic compound comprising a terpenoid moiety (A), a substituted or unsubstituted phenolic or resorcinol moiety (B) and a substituted or unsubstituted phenylethyl arene side chain (C).

Its structure is illustrated below:

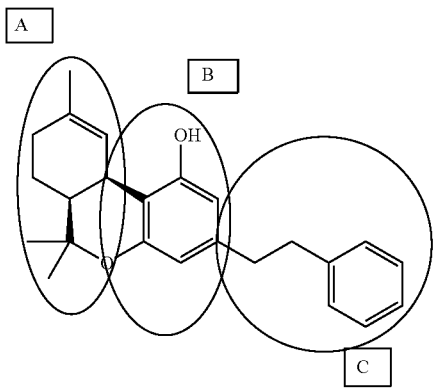

Alternatively (B) and (C) may be referred together as a bibenzyl or dihydrostilbenoid in which case the compounds may be termed terpenylated bibenzyls or terpenylated dihydrostilbinoids.

It can be produced as a cis or trans isomer or as a racemic mix of the cis or trans isomers.

A recent paper by Chicca et al, Sci Adv 2018, compared bibenzyl (−) cis-perrottetinine (cis-PET) and bibenzyl (−) trans-perrottetinine (trans-PET) activity to the cannabinoids trans-delta-9-Tetrahydrocannabinol (trans-THC) and cis-delta-9-Tetrahydrocannabinol (cis-THC).

Applicant speculates that perrottetinene-like compounds, which they define as bis-phenyl or biphenyl with a 2-carbon bridge (saturated or unsaturated) or cannabinoid-like molecules which contain a substituted or unsubstituted phenylethyl arene side chain (C) might have interesting pharmacological and pharmaceutical activity.

Applicant further speculates that given that the chemical structure of perrottetinene was akin to the cannabinoid trans-delta-9-tetrahydrocannabirnol (THC), that other "perrottetinene-like" compounds could be considered cannabinoid-like compounds, with the terpenoid moiety (A)), a substituted or unsubstituted phenolic or resorcinol moiety (B) and a substituted or unsubstituted phenylethyl arene side chain (C).

As stated previously (B) and (C) may alternatively be referred together as a bibenzyl or dihydrostilbenoid.

It was speculated that these compounds in which a terpenoid moiety was attached to a substituted or unsubstituted dihydropinosylvin* might have interesting pharmacological and pharmaceutical activity. Alternative chemical names for Dihydropinosylvin are: 5-phenethylbenzene-1,3-diol; 5-(2-phenylethyl)benzene-1,3-diol or 3,5-Dihydroxybibenzyl.

These perrottetinene like compounds include ring-closed structures (analogous to the cannabinoid tetrahydrocannabinol THC and cannabinol (CBN)) and ring-open structures (analogous to the cannabinoids cannabidiol (CBD), cannabigerol (CBG) and cannabichromene (CBC)).

The structures of THC and CBD are illustrated below along with those of the other major type cannabinoids CBG, CBC and CBN.

| Type | Skeleton | Cyclization |
| --- | --- | --- |
| Cannabidiol-type CBD | | |
| Tetrahydrocannabinol- and Cannabinol-type THC, CBN | | |

One such perrottetinene like compound is the CBD analogue of Perrottetinene (PET) or 5'-methyl-4-phenethyl-2'-(prop-1-ene-2-yl)-1',2',3',4'-tetrahydro-[1,1'-biphenyl]-2,6-diol. It can be produced as:
i) the (−) trans isomer, (1'R,2'R)-5'-mnethyL4-pheniethyl-2'-(prop-1-ene-2-yl)-1',2',3',4'-tetrahydro-[1,1'-biphenyl]-2,6-diol;
ii) the (+) trans isomer, (1'S,2'S)-5'-methyl-4-phenethyl-2'-(prop-1-ene-2-yl)-1',2',3',4'-tetrahydro-[1,1'-biphenyl]-2,6-diol;
iii) the (−) cis isomer, (1'R,2'S)-5'-methyl-4-phenethyl-2'-(prop-1-ene-2-yl)-1',2',3',4'-tetrahydro-[1,1'-biphenyl]-2,6-diol, or
iv) the (+) cis isomer, (1'S,2'R)-5'-methyl-4-phenethyl-2'-(prop-1-ene-2-yl)-1',2',3',4'-tetrahydro-[1,1'-biphenyl]-2,6-diol;
generically referred to hereafter as "CBD-PET".

Another perrottetinene like compound is the CBD analogue of PET-OH or 4-(4-hydroxyphenethyl)-5'-methyl-2'-(prop-1-ene-2-yl)-1',2',3',4'-tetrahydro-[1,1'-biphenyl]-2,6-diol. It can be produced as:
i) the (−) trans isomer, (1'R,2'R)-4-(4-hydroxyphenethyl)-5'-methyl-2'-(prop-1-ene-2-yl)-1',2',3',4'-tetrahydro-[1,1'-biphenyl]-2,6-diol; the (+) trans isomer, (1'S,2'S)-4-(4-hydroxyphenethyl)-5'-methyl-2'-(prop-1-ene-2-yl)-1',2',3',4'-tetrahydro-[1,1'-biphenyl]-2,6-diol;
iii) the (−) cis isomer, (1'R,2'S)-4-(4-hydroxyphenethyl)-5'-methyl-2'-(prop-1-ene-2-yl)-1',2',3',4'-tetrahydro-[1,1'-biphenyl]-2,6-diol, or
iv) the (+) cis isomer, (1'S,2'R)-4-(4-hydroxyphenethyl)-5'-methyl-2'-(prop-1-ene-2-yl)-1',2',3',4'-tetrahydro-[1,1'-biphenyl]-2,6-diol;
generically referred to hereafter as "CBD-PET-OH".

A search of the literature for the CBD analogue of PET identified a paper by Crombie in Journal of the Chemical Society, Perkin Transactions 1: Organic and Bio-Organic Chemistry (1972-1999) (1988), (5), 1263-70 and several patent references including:
EP2314580;
US2019023680;
WO2014177593;
WO2017011210;
WO2017181118; and
WO2017216362.

It is an object of the invention to identify, manufacture and test perrottetinene-like compounds with potential for use as pharmaceuticals.

Two such compounds described herein, and, referred to as CBD-PET and CBD-PET-OH, were manufactured and tested as potential medicines and were found to have potentially useful pharmacology.

SUMMARY OF THE INVENTION

All of the publications, published patent applications, patents and other patent documents cited in the specification are herein incorporated by reference in their entirety. The specification hereby incorporates by reference the contents of the specification and drawings in the US Provisional Patent Application (No. 63/003,270) filed on 31 Mar. 2020 to which the priority is claimed.

In accordance with a first embodiment of the present invention there is provided a compound which is 5'-methyl-4-phenethyl-2'-(prop-1-ene-2-yl)-1',2',3',4'-tetrahydro-[1,1'-biphenyl]-2,6-diol (CBD-PET) or 4-(4-hydroxyphenethyl)-5'-methyl-2'-(prop-1-ene-2-yl)-1',2',3',4'-tetrahydro-[1,1'-biphenyl]-2,6-diol (CBD-PET-OH) or a salt or hydrate thereof.

In one embodiment the CBD-PET is the (−) trans form, namely (1'R,2'R)-5'-methyl-4-phenethyl-2'-(prop-1-ene-2-yl)-1',2',3',4'-tetrahydro-[1,1'-biphenyl]-2,6-diol (CBD-PET) or (1'R,2'R)-4-(4-hydroxyphenethyl)-5'-methyl-2'-(prop-1-ene-2-yl)-1',2',3',4'-tetrahydro-[1,1'-biphenyl]-2,6-diol.

In another embodiment the CBD-PET is the (+) trans form, namely (1'S,2'S)-5'-methyl-4-phenethyl-2'-(prop-1-ene-2-yl)-1',2',3',4'-tetrahydro-[1,1'-biphenyl]-2,6-diol.

In yet another embodiment the CBD-PET is the (−) cis form (1'R,2'S)-5'-methyl-4-phenethyl-2'-(prop-1-ene-2-yl)-1',2',3',4'-tetrahydro-[1,1'-biphenyl]-2,6-diol.

In yet another embodiment the CBD-PET is the (+) cis form, namely (1'S,2'R)-5'-methyl-4-phenethyl-2'-(prop-1-ene-2-yl)-1',2',3',4'-tetrahydro-[1,1'-biphenyl]-2,6-diol.

In one embodiment the CBD-PET-OH is the (−) trans form, i.e. (1'R,2'R)-4-(4-hydroxyphenethyl)-5'-methyl-2'-(prop-1-ene-2-yl)-1',2',3',4'-tetrahydro-[1,1'-biphenyl]-2,6-diol.

In another embodiment the CBD-PET-OH is the (+) trans form, i.e. (1'S,2'S)-4-(4-hydroxyphenethyl)-5'-methyl-2'-(prop-1-ene-2-yl)-1',2',3',4'-tetrahydro-[1,1'-biphenyl]-2,6-diol.

In yet another embodiment the CBD-PET-OH is the (−) cis form, i.e. (1'R,2'S)-4-(4-hydroxyphenethyl)-5'-methyl-2'-(prop-1-ene-2-yl)-1',2',3',4'-tetrahydro-[1,1'-biphenyl]-2,6-diol.

In yet another embodiment the CBD-PET-OH is the (+) cis form, i.e. (1'S,2'R)-4-(4-hydroxyphenethyl)-5'-methyl-2'-(prop-1-ene-2-yl)-1',2',3',4'-tetrahydro-[1,1'-biphenyl]-2,6-diol.

Preferably the CBD-PET and/or CBD-PET-OH are of pharmaceutical grade.

As used herein pharmaceutical grade means that CBD-PET and/or CBD-PET-OH are in the form required by the pharmaceutical regulatory authority in the jurisdiction. Suitably CBD-PET and/or CBD-PET-OH have a purity of at least 90%, at least 91%, at least 92%, at least 93%, at least 94%, at least 95%, at least 96%, at least 98%, more preferably still at least 98%, and most preferably still at least 99%.

In one embodiment the CBD-PET and/or CBD-PET-OH are present predominantly as the p isomer.

In another embodiment the CBD-PET and/or CBD-PET-OH are present predominantly as the o isomer.

By predominantly suitably means greater than 60%, greater than 65%, greater than 70%, greater than 75%, greater than 80%, greater than 85%, greater than 90%, and more preferably greater than 95% of the compound is present in the specified isomeric form.

In yet a further embodiment the CBD-PET and/or CBD-PET-OH are present as a racemic mix of the (+) or (−) forms of either the trans or cis isomers and/or the two regio p or o-isomers. Preferably the mix is in a controlled ratio such as a ratio of between 5:1 to 1:5, 4:1 to 1:4, 3:1 to 1:3 or 2:1 to 1:2.

In accordance with a second embodiment of the present invention there is provided CBD-PET and/or CBD-PET-OH for use in medicine or as a medicament.

In a first embodiment the CBD-PET and/or CBD-PET-OH are the (−) trans isomer.

In a second embodiment the CBD-PET and/or CBD-PET-OH are the (+) trans isomer

In a third embodiment the CBD-PET and/or CBD-PET-OH are a racemic mix of the (−) trans and (+) trans isomer.

In a fourth embodiment the CBD-PET and/or CBD-PET-OH are the (−) cis isomer.

In a fifth embodiment the CBD-PET and/or CBD-PET-OH are the (+) cis isomer

In a sixth embodiment the CBD-PET and/or CBD-PET-OH are a racemic mix of the (−) cis and (+) cis isomer.

In a preferred first embodiment the compound is CBD-PET (FIG. 2f), and more particularly (−)-trans-CBD-PET (FIG. 2b)).

Alternatively, it may be the (+) trans CBD-PET (FIG. 2c), the (−)-cis-CBD-PET (FIG. 2d), or the (+)-cis-CBD-PET (FIG. 2e) or racemic mixtures of respective (+) and (−) isomers.

In a preferred second embodiment the compound is CBD-PET-OH (FIG. 3f), and more particularly (−)-trans-CBD-PET-OH (FIG. 3b)).

Alternatively, it may be the (+) trans CBD-PET-OH (FIG. 3c), the (−)-cis-CBD-PET-OH (FIG. 3d), or the (+) cis-CBD-PET-OH (FIG. 3e) (+) and (−) isomers or racemic mixtures of respective (+) and (−) isomers.

In both preferred embodiments the para (p) isomer was selected in preference to the alternative ortho (o) isomer. However, in further embodiments, the ortho (o) isomer may be selected in preference to the alternative para (p) isomer.

The compounds of the preferred embodiments 1 and 2 may be present as a pure or substantially pure isomer, or as a racemic mixture having a specified ratio of the respective isomers. As used herein, substantially pure can mean that the isomer has a purity of at least 90%, at least 91%, at least 92%, at least 93%, at least 94%, at least 95%, at least 96%, at least 98%, more preferably still at least 98%, and most preferably still at least 99%.

Most preferably the substantially pure isomers are the (−) trans as opposed to the (+) trans isomer.

In yet another embodiment the meta variant of CBD-PET and/or CBD-PET-OH may be produced or selected.

In accordance with a third embodiment of the present invention there is provided a pharmaceutical composition comprising CBD-PET and/or CBD-PET-OH, suitably together with one or more pharmaceutically acceptable excipient(s).

The CBD-PET and/or CBD-PET-OH may be present as the (−) or (+) trans or (−) or (+) cis isomers or as a racemic mix of the respective (+) or (−) trans or (+) or (−) cis forms.

The compounds may be present as a salt, hydrate, free acid or base or other form, for example to improve its bioavailability or other characteristics.

The composition may be formulated for delivery by any standard pharmaceutical route including parenteral (intraperitoneal, intravenous, intramuscular, and subcutaneous), oral, nasal including nasogastric, ocular, transmucosal (buccal, vaginal, and rectal), and/or transdermal.

The identified active pharmaceutical agents, i.e. CBD-PET and/or CBD-PET-OH, and/or a pharmaceutically acceptable salt or hydrate thereof, are particularly suited to treat seizures and/or epilepsy. This is based on the results obtained in two well understood animal models of seizure.

The Pentylenetetrazole (PTZ) model (PTZ is a GABA receptor antagonist) is a model of generalized seizure (contrast with partial or focal seizure). It produces a clonic, tonic-clonic, or myoclonic seizure that models absence (petit mal) seizures. As a generalized seizure model it has features that differentiate it from the Maximal ElectroShock (MES) Seizure model (also a model of generalized seizure).

In epilepsy, myoclonic seizures usually cause abnormal movements on both sides (left and right) of the body at the same time. They occur in a variety of epilepsy syndromes that have different characteristics.

Juvenile myoclonic epilepsy (JME): The seizures usually involve the neck, shoulders, and upper arms. In many patients the seizures most often occur soon after waking up. They usually begin around puberty or sometimes in early adulthood in people with a normal range of intelligence. In most cases, these seizures can be well controlled with medication, but it must be continued throughout life.

Lennox-Gastaut syndrome (LGS): This is an uncommon syndrome that usually includes other types of seizures as well. It begins in early childhood. The myoclonic seizures usually involve the neck, shoulders, upper arms, and often the face. They may be quite strong and are difficult to control.

Progressive myoclonic epilepsy (PME): The rare syndromes in this category feature a combination of myoclonic seizures and tonic-clonic seizures. Treatment is usually not successful for very long, as the patient deteriorates over time.

The maximal electroshock (MES) model on the other hand is categorized as a model of generalized tonic-clonic seizure. When screening anticonvulsant candidates the MES model is an excellent tool for evaluating anti-seizure characteristics compared to a focal or partial seizure (Psychomotor Seizure).

Tonic-clonic seizures can start in one or both sides of the brain.

When they start in both sides of the brain, they are called generalized onset motor seizures or a generalized tonic-clonic seizure. Both terms mean the same thing.

When they start in one side of the brain and spread to affect both sides, the term focal to bilateral tonic-clonic seizure is used.

Based on statistically significant data obtained in these two seizure models both compounds exhibit anti-seizure activity.

Both CBD-PET and CBD-PET-OH were shown to be effective in the PTZ model with CBD-PET showing activity against both clonic and tonic seizures, and CBD-PET-OH being particularly effective against tonic seizures. The results were statistically significant.

CBD-PET-OH was effective in an MES model, again showing statistically significant activity against tonic and/or tonic-clonic seizures.

In both cases CBD-PET and CBD-PET-OH were used at a mouse dose of 200 mg/Kg which based on the FDA's conversion factors—see https://www.fda.gov/media/72309/download (incorporated byreference) equates to a human equivalent dose of 200×0.08=16 mg/Kg or for an "average" adult weighing 60 Kg, a dose of 960 mg.

Based on this early data one might anticipate a human dose to be in the order of from 8 mg/Kg to 32 mg/Kg or as a dose for a 60 Kg patient from 480 mg to 1920 mg or intermediate values therebetween such as, 12 mg/Kg to 24 mg/Kg or as a dose for a 60 Kg patient from 720 mg to 1440 mg.

In accordance with a fourth embodiment of the present invention there is provided a method of treating a subject comprising administering to the patient an effective amount of CBD-PET and/or CBD-PET-OH in a unit dosage form.

The patient may be an adult, child, neonate or infant or adult or juvenile animal, particularly a companion animal, such as a dog or cat, or a horse.

In one embodiment the dose is in the form of a parenteral (intraperitoneal, intravenous, intramuscular, and subcutaneous), oral, nasal including nasogastric, ocular, transmucosal (buccal, vaginal, and rectal), or transdermal form.

Preferably the method of treatment is to treat seizures and/orepilepsy.

Seizures are classified as per the ILAE seizure classification 2017 reproduced in the table below:

| ILAE 2017 Classification of Seizure Types Expanded Version [1] |||
|---|---|---|
| Focal Onset | Generalized Onset | Unknown Onset |
| Aware / Impaired Awareness | Motor<br>  tonic-clonic<br>  clonic | Motor<br>  tonic-clonic<br>  epileptic spasms |
| Motor Onset<br>  automatisms<br>  atonic[2]<br>  clonic<br>  epileptic spasms[2]<br>  hyperkinetic<br>  myoclonic<br>  tonic<br>Nonmotor Onset<br>  autonomic<br>  behavior arrest<br>  cognitive<br>  emotional<br>  sensory | tonic<br>  myoclonic<br>  myoclonic-tonic-clonic<br>  myoclonic-atonic<br>  atonic<br>  epileptic spasms<br>Nonmotor (absence)<br>  typical<br>  atypical<br>  myoclonic<br>  eyelid myoclonia | Nonmotor<br>  behavior arrest<br>Unclassified [3] |
| focal to bilateral<br>  tonic-clonic | | |

The seizures to be treated may include one or more of: a generalised onset seizure including a myoclonic seizure, a myoclonic-tonic-clonic seizure, a clonic seizure, a tonic seizure and/or a tonic-clonic seizure.

The epilepsy or a syndrome associated with epilepsy include but are not limited to: Juvenile myoclonic epilepsy; Lennox-Gastaut syndrome or Progressive myoclonic epilepsy.

In one embodiment the effective dose for a human is a dose of from 8 mg/Kg to 32 mg/Kg or as a dose for a 60 Kg patient from 480 mg to 1920 mg or intermediate values therebetween such as, 12 mg/Kg to 24 mg/Kg or as a dose for a 60 Kg patient from 720 mg to 1440 mg.

For companion animals such as dogs, cats and horses a dose can be determined using standard conversion factors available to a skilled person.

In accordance with a fifth embodiment of the present invention there is provided a method of manufacturing a perrottetinene-like compound comprising the steps of: reacting p Menthadienot with Dihydropinosylvin or Dihydroresvratrol in the presence of a Lewis acid, characterised in that the Lewis acid is zinc triflate.

Applicant has surprisingly determined that zinc triflate and other Lewis acids can be more effective as a catalyst providing much greater conversion thereby giving substantially greater yields of the enantiomers of interest.

The present invention provides the following:

[1] A compound which is (1'R,2'R)5'-methyl-4-phenethyl-2'-(prop-1-ene-2-yl)-1',2',3',4'-tetrahydro-[1,1'-biphenyl]-2,6-diol (CBD-PET) or (1'R,2'R)-4-(4-hydroxyphenethyl)-5'-methyl-2'-(prop-1-ene-2-yl)-1',2',3',4'-tetrahydro-[1,1'-biphenyl]-2,6-diol (CBD-PET-OH).

[2] The compound of [1] which is (−)-trans-CBD-PET.

[3] The compound of [1] which is (−)-trans-CBD-PET-OH.

[4] The compound according to any one of [1] to [3], which is a substantially pure p isomer.

[5] The compound of any one of [1] to [3], which is a substantially pure o isomer.

[6] The compound according to anyone of [1] to [3], which is a mixture of both p and o isomers.

[7] The compound of [4] or [5], wherein the isomer is at greater than 95% purity.

[8] The compound of [6], wherein the two isomers forming the mixture are together present at greater than 95% purity.

[9] The compound according to anyone of [1] to [8] for use in medicine

[10] A pharmaceutical composition for treating a condition which is seizure or epilepsy in a patient, comprising the compound according to any one of [1] to [8].

[11] A method for treating a condition which is seizure or epilepsy in a patient, comprising administering to the patient a therapeutically effective amount of the compound according to any one of [1] to [8].

[12] The compound according to any one of [1] to [8] for use in the treatment of a condition which is seizure or epilepsy in a patient.

Use of the compound according to anyone of [1] to [8] in manufacturing a medicine for treating a condition which is seizure or epilepsy in a patient.

[14] The pharmaceutical composition of [10], the method of [11], the compound for use according to [12], or the use of [13], wherein the condition to be treated is generalised epilepsy.

[15] The pharmaceutical composition of [10], the method of [11], the compound for use according to [12], or the use of [13], wherein the condition to be treated is myoclonic seizure.

[16] The pharmaceutical composition of [10], the method of [11], the compound for use according to [12], or the use of [13], wherein the condition to be treated is Juvenile myoclonic epilepsy, Lennox-Gastaut syndrome or Progressive myoclonic epilepsy.

[17] The pharmaceutical composition of [10], the method of [11], the compound for use according to [12], or the use of [13], wherein the condition to be treated is a clonic seizure, tonic seizure or tonic-clonic seizure.

[18] The pharmaceutical composition according to any one of [10]-[17], the method according to any one of [11]-[17], the compound for use according to any one of [12]-[17], or the use according to any one of [13]-[17], wherein the compound is packaged for delivery or delivered at an effective dose through one of the following routes: parenteral, oral, nasal including nasogastric, ocular, transmucosal or transdermal.

The pharmaceutical composition according to any one of [10]-[18], the method according to any one of [11]-[18], the compound for use according to any one of [12]-[18], or the use according to any one of [13]-[18], wherein the patient is a human patient.

[20] The pharmaceutical composition according to any one of [10]-[19], the method according to any one of [11]-[19], the compound for use according to any one of [12]-[19], or the use according to any one of [13]-[19], wherein the compound is administered to the patient at a dose of at least 8 mg/Kg.

[21] A method of manufacturing a perrottetinene-like compound comprising (the steps of:) reacting menthadienol with dihydropinosylvin or dihydroresvratrol, e.g. in the presence of a Lewis acid.

[22] The method of [21], wherein the Lewvis acid is a zinc based acid.

[23] The method of [22], wherein the zinc based acid is zinc triflate.

[24] The method of [23], wherein the initial amount of zinc triflate is 0.01-0.05 mole equivalent to menthadienol.

[25] The method according to any one of [21] to [24], wherein the reaction of menthadienol with dihydropinosylvin or dihydroresvratrol takes place under the temperature ranging 80-120° C.

[26] The method according to any one of [21] to [24], wherein the perrottetinene-like compound is (1'R,2'R)-5'-methyl-4-phenethyl-2'-(prop-1-ene-2-yl)-1',2',3',4'-tetrahydro-[1,1'-biphenyl]-2,6-diol (CBD-PET) vimenthadienol is reacted with dihydropinosylvin.

[27] The method according to any one of [21] to [24], wherein the perrottetinene-like compound is (1'R,2'R)-4-(4-hydroxyphenethyl)-5'-methyl-2'-(prop-1-ene-2-yl)-1',2',3', 4'-tetrahydro-[1,1'-biphenyl]-2,6-diol (CBD-PET-OH) v-m menthadienol is reacted with dihydroresvratrol.

[28] The method of [27], further comprising the step of producing dihydroresvratrol by hydrogenating trans-resveratrol in the presence of palladium on carbon (Pd/C).

The present invention also provides the followings:

[1a] (1'R,2'R)-5'-methyl-4-phenethyl-2'-(prop-1-ene-2-yl)-1',2',3',4'-tetrahydro-[1,1'-biphenyl]-2,6-diol (CBD-PET) or (1'R,2'R)-4-(4-hydroxyphenethyl)-5'-methyl-2'-(prop-1-ene-2-yl)-1',2',3',4'-tetrahydro-[1,1'-biphenyl]-2,6-diol (CBD-PET-OH).

[2a] CBD-PET as recited in [1a] which is (−) trans-CBD-PET (FIG. 2).

[3a] CBD-PET-OH as recited [1a] which is (−)-trans-CBD-PET-OH (FIG. 3).

[4a] CBD-PET or CBD-PET-OH as recited in any of [1a] to [3a] which is present as a substantially pure p isomer.

[5a] CBD-PET or CBD-PET-OH as recited in any of [1a] to [3a] which is present as a substantially pure o isomer.

[6a] CBD-PET or CBD-PET-OH as recited in any of [1a] to [3a] which is present as a mix of both p and o isomers.

[7a] CBD-PET or CBD-PET-OH as recited in [4a] or [5a] wherein the isomer is present at greater than 95% purity.

[8a] CBD-PET or CBD-PET-OH as recited in [6a] wherein the two isomers forming the mix are together present at greater than 95% purity.

[9a] CBD-PET or CBD-PET-OH as recited in any of [1a] to [8a] for use in medicine

[10a] CBD-PET or CBD-PET-OH as recited in any of [1a] to [9a] wherein the CBD-PET or CBD-PET-OH is packaged for delivery or delivered at an effective dose by one of the following routes: parenteral, oral, nasal including nasogastric, ocular, transmucosal or transdermal.

[11a] CBD-PET or CBD-PET-OH as recited in any of [1a] to [10a] for use in the treatment of seizures or epilepsy.

[12a] CBD-PET or CBD-PET-OH as recited in [11a] for use in the treatment of generalised epilepsy.

[13a] CBD-PET or CBD-PET-OH as recited in [12a] for use in the treatment of myoclonic seizures.

[14a] CBD-PET or CBD-PET-OH as recited in [13a] for use in the treatment of Juvenile myoclonic epilepsy, Lennox-Gastaut syndrome or Progressive myoclonic epilepsy.

[15a] CBD-PET or CBD-PET-OH as recited in [12a] for use in the treatment of a clonic, tonic or tonic-clonic seizure.

[16a] CBD-PET or CBD-PET-OH as recited in any of [1a] to [15a] which is delivered at a dose of at least 8 mg/Kg.

[17a] A pharmaceutical composition comprising CBD-PET or CBD-PET-OH together with one or more pharmaceutical excipients.

[18a] A method of treating a subject comprising administering to the patient an effective amount of CBD-PET or CBD-PET-OH in unit dosage form.

[19a] A method as recited in [18a] wherein the subject is an adult, child, neonate or infant or adult or juvenile animal, particularly a companion animal, such as a dog.

[20a] A method of manufacturing a perrottetinene-like compound comprising the steps of: reacting p Menthadienol with Dihydropinosylvin or Dihydroresvratrol in the presence of a Lewis acid, characterised in that the Lewis acid is zinc triflate.

[1b] A compound which is any one selected from the group consisting of:

5'-methyl-4-phenethyl-2'-(prop-1-ene-2-yl)-1',2',3',4'-tetrahydro-[1,1'-biphenyl]-2,6-diol (FIG. 2f) having the following structure

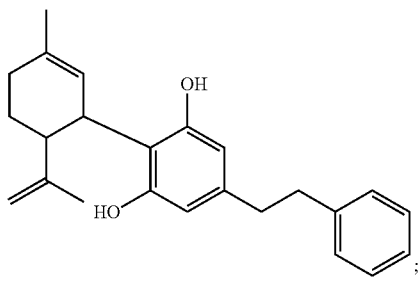

(p-CBD-PET)

4-(4-hydroxyphenethyl)-5'-methyl-2'-(prop-1-ene-2-yl)-1',2',3',4'-tetrahydro-[1,1'-biphenyl]-2,6-diol (FIG. 3f) having the following structure

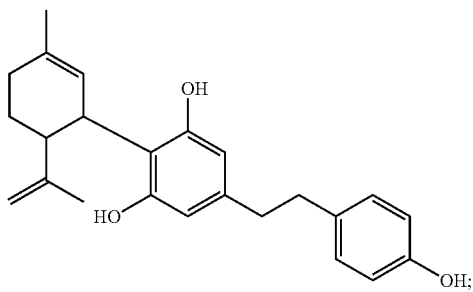

(p-CBD-PET-OH)

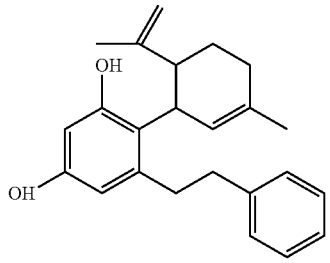

(o-CBD-PET) ; and

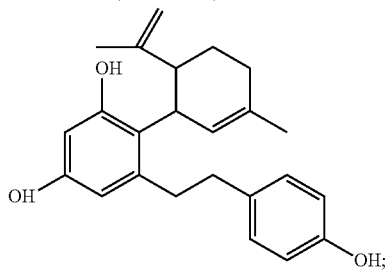

(o-CBD-PET-OH)

or a pharmaceutically acceptable salt or hydrate thereof.

[2b] The compound of [1b], which is 5'-methyl-4-phenethyl-2'-(prop-1-ene-2-yl)-1',2',3',4'-tetrahydro-[1,1'-biphenyl]-2,6-diol (CBD-PET) (FIG. 2f) having the following structure

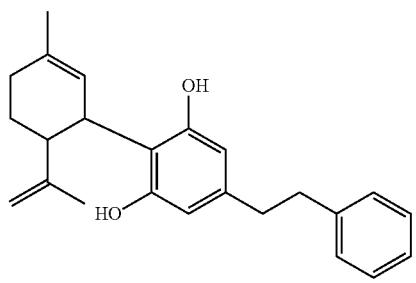 [SMILES: C=C(C)C1CCC(C)=CC1c1c(O)cc(CCc2ccccc2)cc1O]

or a pharmaceutically acceptable salt or hydrate thereof.

[3b] The compound of [1b], which is 4-(4-hydroxyphenethyl)-5'-methyl-2'-(prop-1-ene-2-yl)-1',2',3',4'-tetrahydro-[1,1'-biphenyl]-2,6-diol (CBD-PET-OH) (FIG. 3f)

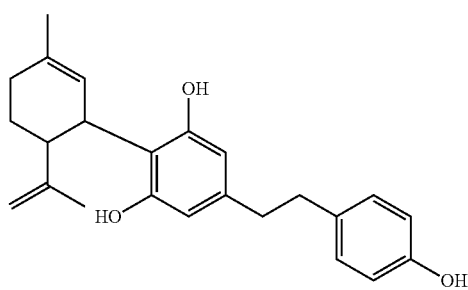 [SMILES: C=C(C)C1CCC(C)=CC1c1c(O)cc(CCc2ccc(O)cc2)cc1O]

or a pharmaceutically acceptable salt or hydrate thereof.

[4b] The compound of [1b], which is (1'R,2'R)-5'-methyl-4-phenethyl-2'-(prop-1-ene-2-yl)-1',2',3',4'-tetrahydro-[1,1'-biphenyl]-2,6-diol ((−) trans-CBD-PET) (FIG. 2b)

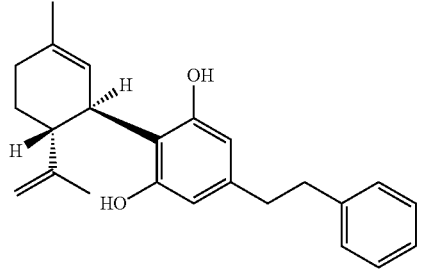 [SMILES: C=C(C)[C@@H]1CCC(C)=C[C@H]1c1c(O)cc(CCc2ccccc2)cc1O]

or a pharmaceutically acceptable salt or hydrate thereof.

[5b] The compound of [1b], which is (1'S,2'S)-5'-methyl-4-phenethyl-2'-(prop-1-ene-2-yl)-1',2',3',4'-tetrahydro-[1,1'-biphenyl]-2,6-diol) ((+)-cis-CBD-PET) (FIG. 2c)

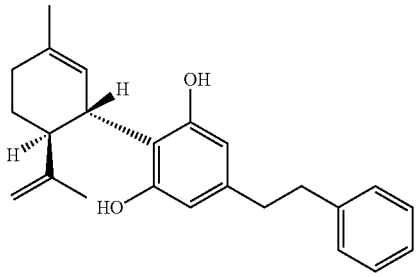 [SMILES: C=C(C)[C@H]1CCC(C)=C[C@@H]1c1c(O)cc(CCc2ccccc2)cc1O]

or a pharmaceutically acceptable salt or hydrate thereof.

[6b] The compound of [1b], which is (1'R,2'S)-5'-methyl-4-phenethyl-2'-(prop-1-ene-2-yl)-1',2',3',4'-tetrahydro-[1,1'-biphenyl]-2,6-diol ((−) cis-CBD-PET) (FIG. 2d)

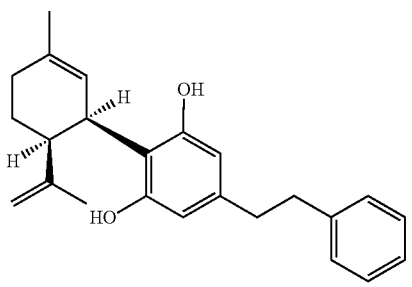 [SMILES: C=C(C)[C@H]1CCC(C)=C[C@H]1c1c(O)cc(CCc2ccccc2)cc1O]

or a pharmaceutically acceptable salt or hydrate thereof.

[7b] The compound of [1b], which is (1'S,2'R)-5'-methyl-4-phenethyl-2'-(prop-1-ene-2-yl)-1',2',3',4'-tetrahydro-[1,1'-biphenyl]-2,6-diol) ((+)-cis-CBD-PET) (FIG. 2e)

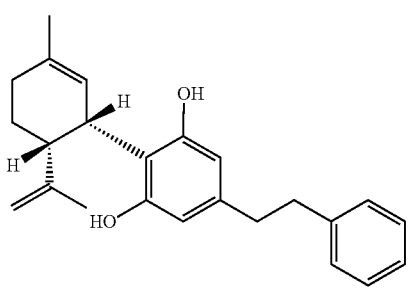 [SMILES: C=C(C)[C@@H]1CCC(C)=C[C@@H]1c1c(O)cc(CCc2ccccc2)cc1O]

or a pharmaceutically acceptable salt or hydrate thereof.

[8b] The compound of [1b], which is (1'R,2'R)-4-(4-hydroxyphenethyl)-5'-methyl-2'-(prop-1-ene-2-yl)-1',2',3',4'-tetrahydro-[1,1'-biphenyl]-2,6-diol ((−) trans-CBD-PET-OH) (FIG. 3b)

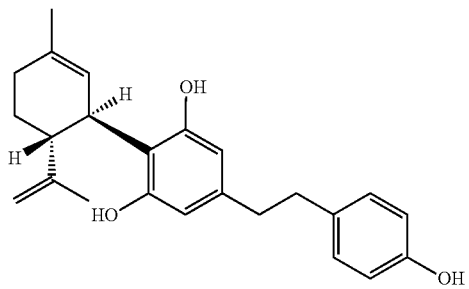 [SMILES: C=C(C)[C@@H]1CCC(C)=C[C@H]1c1c(O)cc(CCc2ccc(O)cc2)cc1O]

or a pharmaceutically acceptable salt or hydrate thereof.

[9b] The compound of [1b], which is (1'S,2'S)-4-(4-hydroxyphenethyl)-5'-methyl-2'-(prop-1-ene-2-yl)-1',2',3',4'-tetrahydro-[1,1'-biphenyl]-2,6-diol ((+) cis CBD-PET-OH) (FIG. 3c)

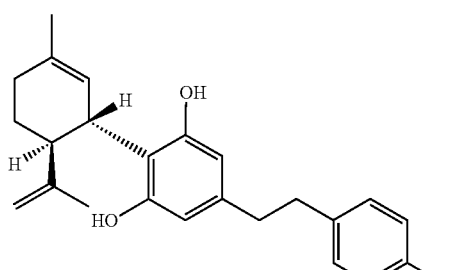

or a pharmaceutically acceptable salt or hydrate thereof.

[10b] The compound of [1b], which is (1'R,2'S)-4-(4-hydroxyphenethyl)-5'-methyl-2'-(prop-1-ene-2-yl)-1',2',3',4'-tetrahydro-[1,1'-biphenyl]-2,6-diol ((−) cis-CBD-PET-OH) (FIG. 3d)

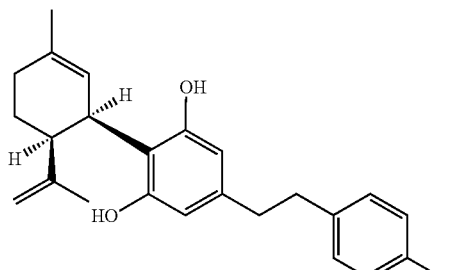

or a pharmaceutically acceptable salt or hydrate thereof.

[11b] The compound of [1b], which is (1'S,2'R)-4-(4-hydroxyphenethyl)-5'-methyl-2'-(prop-1-ene-2-yl)-1',2',3',4'-tetrahydro-[1,1'-biphenyl]-2,6-diol ((+) cis CBD-PET-OH) (FIG. 3e)

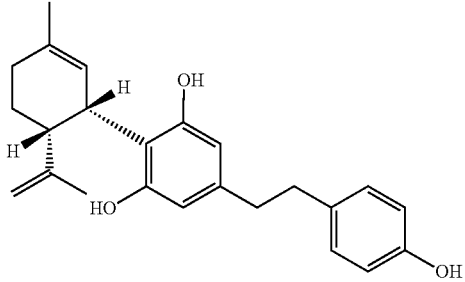 [SMILES: C=C(C)[C@@H]1CCC(C)=C[C@@H]1c1c(O)cc(CCc2ccc(O)cc2)cc1O]

or a pharmaceutically acceptable salt or hydrate thereof.

[12b] The compound of [1b], which is an o-isomer of trans-CBD-PET having a structure:

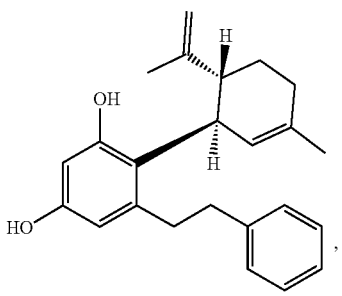

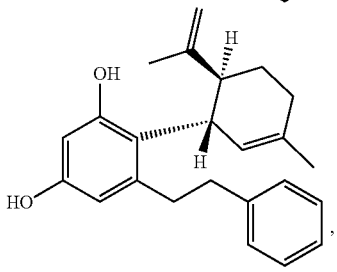

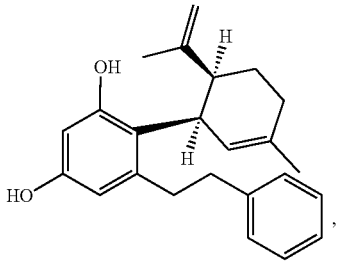

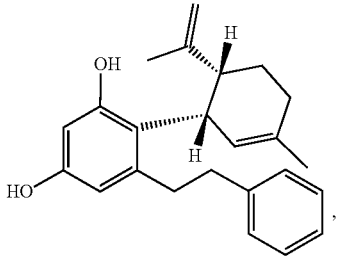

or a pharmaceutically acceptable salt or hydrate thereof.

[13b] The compound of The compound of [1 b], which is o-isomer of trans-CBD-PET-OH having a structure:

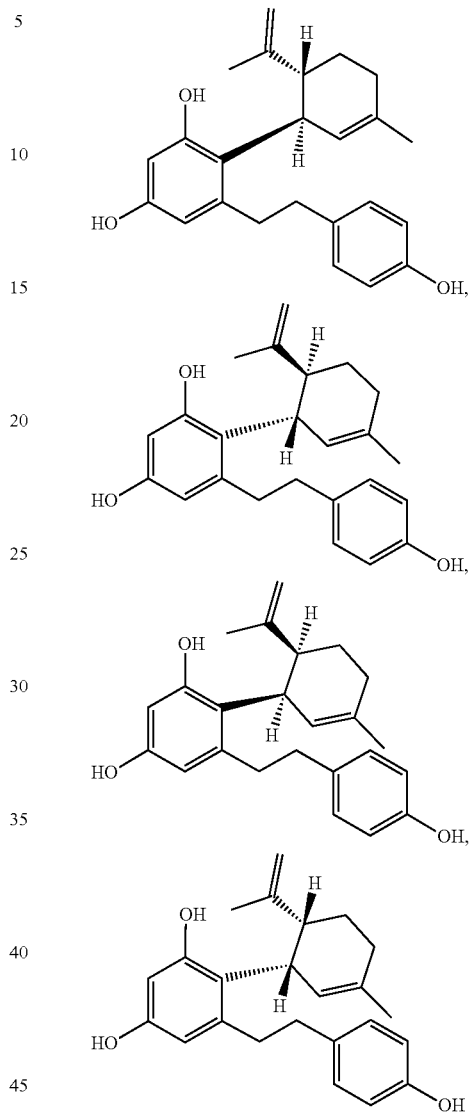

or a pharmaceutically acceptable salt or hydrate thereof.

[14b] The compound according to any one of [1b] to [13b], which is present as a substantially pure isomer.

[15b] The compound according to anyone of [1b] to [13b], which is present as a racemic mixture of isomers.

[16b] The compound according to anyone of [1b] to [13b], which is a substantially pure p isomer.

[17b] The compound of any one of [1b] to [13b], which is a substantially pure o isomer.

[18b] The compound of [16b] or [17b], wherein the isomer is at greater than 95% purity.

[19b] The compound according to anyone of [1b] to [13b], which is a mixture of both p and o isomers.

[20b] The compound of [19b], wherein the two isomers forming the mixture are together present at greater than 95% purity.

[21b] The compound according to any one of [1b] to [20b], for use in a medicine.

[22b] A pharmaceutical composition for treating a condition which is seizure or epilepsy in a patient, comprising the compound according to anyone of [1b] to [20b].

[23b] A method for treating a condition which is seizure or epilepsy in a patient, comprising administering to the patient a therapeutically effective amount of the compound according to anyone of [1b] to [20b].

[24b] The compound according to anyone of [1b] to [20b] for use in the treatment of a condition which is seizure or epilepsy in a patient.

[25b] Use of the compound according to anyone of [1b] to [20b] in manufacturing a medicine for treating a condition which is seizure or epilepsy in a patient.

[26b] The pharmaceutical composition of [22b], the method of [23b], the compound for use according to [24b], or the use of [25b], wherein the condition to be treated is generalised epilepsy.

[27b] The pharmaceutical composition of [22b], the method of [23b], the compound for use according to [24b], or the use of [25b], wherein the condition to be treated is myoclonic seizure.

[28b] The pharmaceutical composition of [22b], the method of [23b], the compound for use according to [24b], or the use of [25b], wherein the condition to be treated is Juvenile myoclonic epilepsy, Lennox-Gastaut syndrome or Progressive myoclonic epilepsy.

[29b] The pharmaceutical composition of [22b], the method of [23b], the compound for use according to [24b], or the use of [25b], wherein the condition to be treated is a clonic seizure, tonic seizure or tonic-clonic seizure.

[30b] The pharmaceutical composition according to any one of [22b]-[29b], the method according to any one of [23b]-[29b], the compound for use according to any one of [24b]-[29b], or the use according to any one of [25b]-[29b], wherein the compound is packaged for delivery or delivered at an effective dose through one of the following routes: parenteral, oral, nasal including nasogastric, ocular, transmucosal or transdermal.

[31b] The pharmaceutical composition according to any one of [22b]-[30b], the method according to any one of [23b]-[30b], the compound for use according to any one of [24b]-[30b], or the use according to any one of [25b]-[30b], wherein the patient is a human patient.

[32b] The pharmaceutical composition according to any one of [22b]-[31 b], the method according to any one of [23b]-[31b], the compound for use according to any one of [24b]-[31b], or the use according to any one of [25b]-[31 b], wherein the compound is administered to the patient at a dose of at least 8 mg/Kg.

[33b] A method of manufacturing a perrottetinene-like compound comprising the steps of: reacting menthadienol with dihydropinosylvin or dihydroresvratrol in the presence of a Lewis acid.

[34b] The method of [33b], wherein the Lewis acid is a zinc based acid.

[35b] The method of [34b], wherein the zinc based acid is zinc triflate.

[36b] The method of [35b], wherein the initial amount of the zinc triflate is 0.01-0.05 mole equivalent to menthadienol.

[37b] The method according to any one of [33b] to [36b], wherein the reaction of menthadienol with dihydropinosylvin or dihydroresvratrol takes place under the temperature ranging 80-120° C.

[38b] The method according to any one of [33b] to [36b], wherein the perrottetinene-like compound is (1'R,2'R)-5'-methyl-4-phenethyl-2'-(prop-1-ene-2-yl)-1',2',3',4'-tetrahydro-[1,1'-biphenyl]-2,6-diol (CBD-PET) vInmenthadienol is reacted with dihydropinosylvin.

[39b] The method according to any one of [33b] to [36b], wherein the perrottetinene-like compound is (1'R,2'R)-4-(4-hydroxyphenethyl)-5'-methyl-2'-(prop-1-ene-2-yl)-1',2',3', 4'-tetrahydro-[1,1'-biphenyl]-2,6-diol (CBD-PET-OH) vin menthadienol is reacted with dihydroresvratrol.

[40b] The method of [39b], further comprising the step of producing dihydroresvratrol by hydrogenating trans-resveratrol in the presence of palladium on carbon (Pd/C).

[41b] The method according to any one of [33b] to [40b], wherein menthadienol is p-menthadienol.

BRIEF DESCRIPTION OF THE DRAWINGS

An embodiment of the invention is further described hereinafter with reference to the accompanying drawing, in which.

DETAILED DESCRIPTION

Compound

The present invention provides a compound selected from the group consisting of:

5'-methyl-4-phenethyl-2'-(prop-1-ene-2-yl)-1',2',3',4'-tetrahydro-[1,1'-biphenyl]-2,6-diol (FIG. 2f) having the following structure

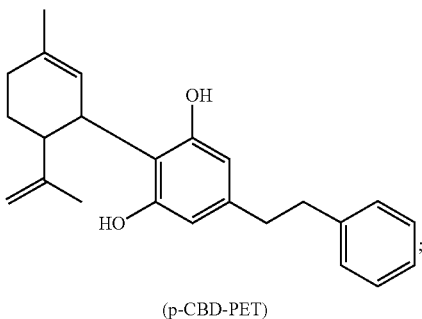 [SMILES: C=C(C)C1CCC(C)=CC1Cc1c(O)cc(CCc2ccccc2)cc1O]

(p-CBD-PET)

4-(4-hydroxyphenethyl)-5'-methyl-2'-(prop-1-ene-2-yl)-1', 2',3',4'-tetrahydro-[1,1'-biphenyl]-2,6-diol (FIG. 3f) having the following structure

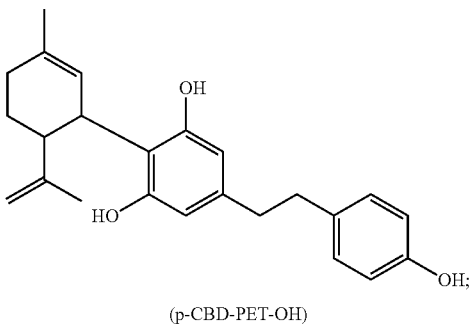

(p-CBD-PET-OH)

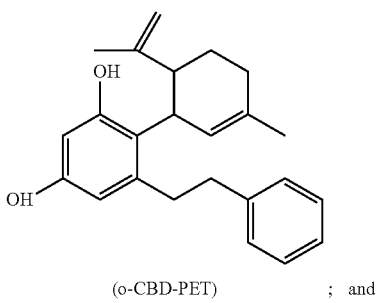

(o-CBD-PET)     ; and

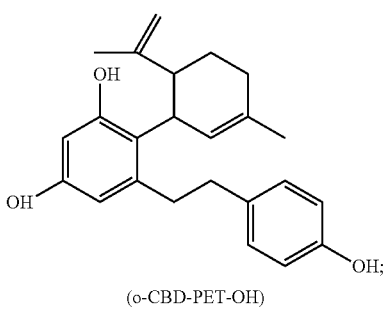

(o-CBD-PET-OH)

or a pharmaceutically acceptable salt or hydrate thereof.

These compounds may hereinafter collectively be referred to as the compound of the present invention or the compound of the invention.

In one embodiment, the compound of the present invention may be 5'-methyl-4-phenethyl-2'-(prop-1-ene-2-yl)-1',2',3',4'-tetrahydro-[1,1'-biphenyl]-2,6-diol (CBD-PET) (FIG. 2f) having the following structure

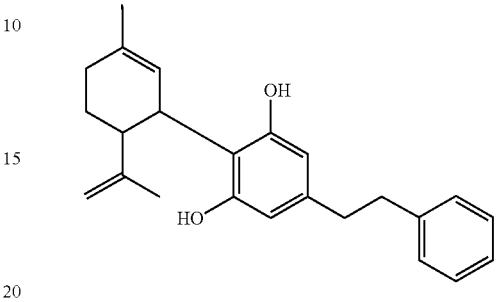

or a pharmaceutically acceptable salt or hydrate thereof.

Figure 3A:
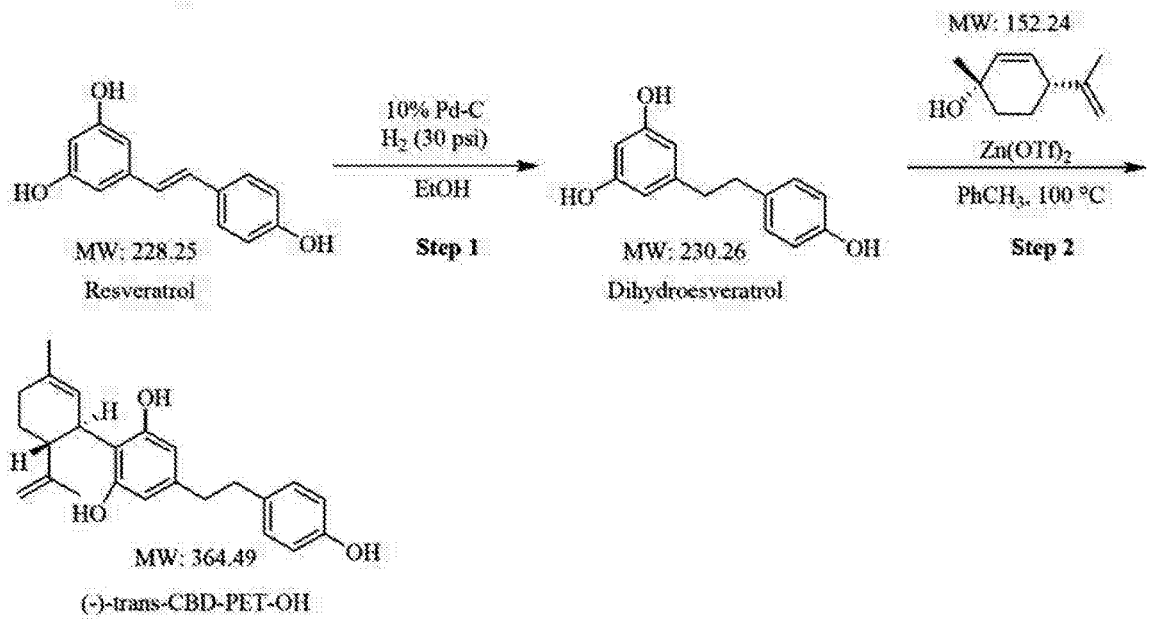
FIG. 3a is a scheme for the synthesis of CBD-PET-OH.
Figure 3B:
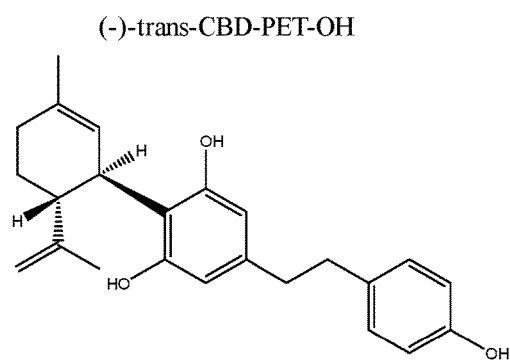
FIG. 3b illustrates the (−) trans isomer.
Figure 3C:
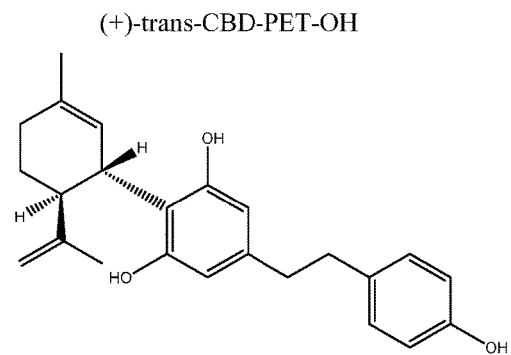
FIG. 3c illustrates the (+) trans isomer.
Figure 3D:
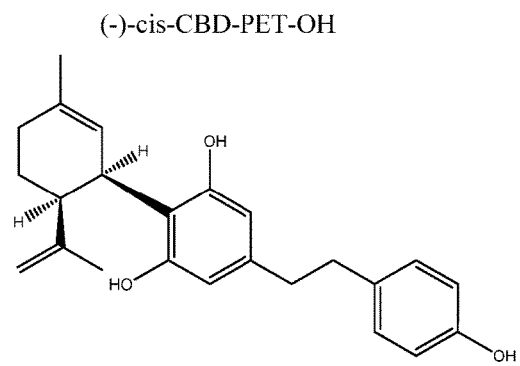
FIG. 3d illustrates the (−) cis isomer.
Figure 3E:
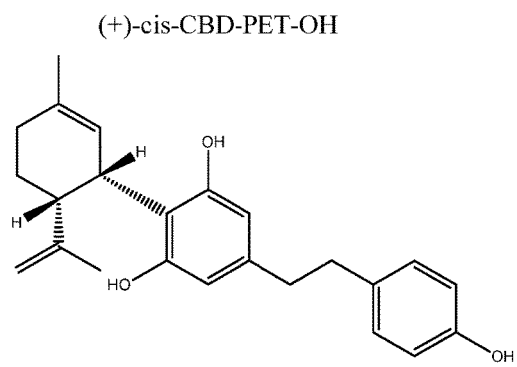
FIG. 3e illustrates the (+) cis isomer.
Figure 3F:
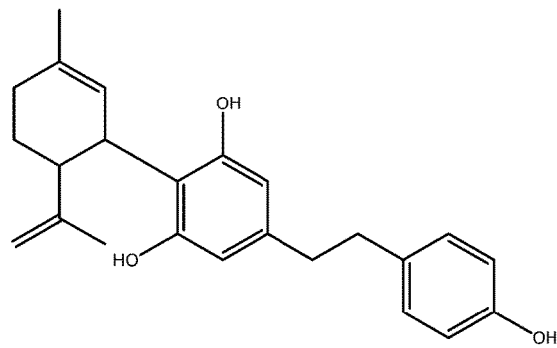
FIG. 3f illustrates CBD-PET-OH with no stereochemistry.

In one embodiment, the compound of the present invention may be 4-(4-hydroxyphenethyl)-5'-methyl-2'-(prop-1-ene-2-yl)-1',2',3',4'-tetrahydro-[1,1'-biphenyl]-2,6-diol (CBD-PET-OH) (FIG. 3f)

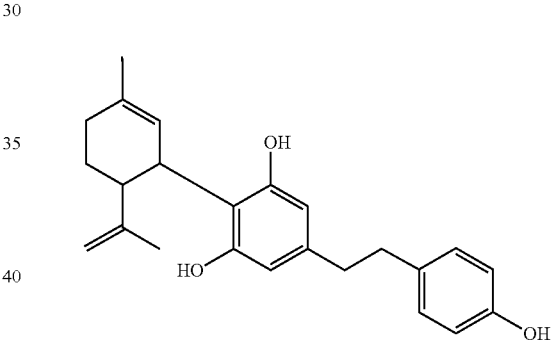

or a pharmaceutically acceptable salt or hydrate thereof.

Figure 2A:
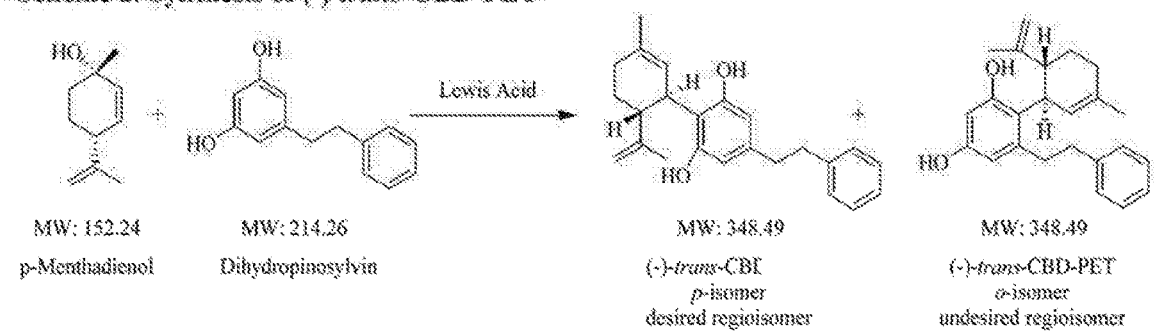
FIG. 2a is a scheme for the synthesis of CBD-PET.
Figure 2B:
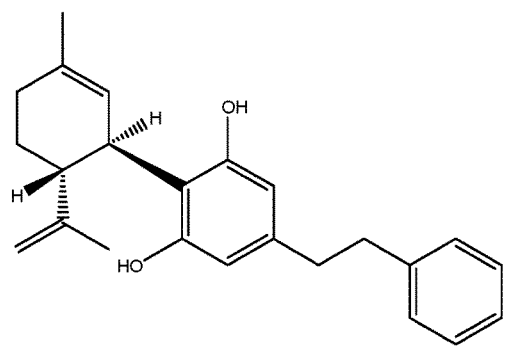
FIG. 2b illustrates the (−) trans isomer.

In one embodiment, the compound of the present invention may be (1'R,2'R)-5'-methyl-4-phenethyl-2'-(prop-1-ene-2-yl)-1',2',3',4'-tetrahydro-[1,1'-biphenyl]-2,6-diol ((−)trans-CBD-PET) (FIG. 2b)

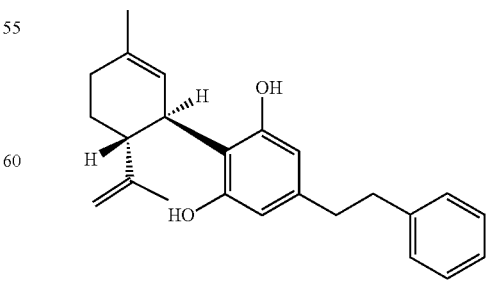

or a pharmaceutically acceptable salt or hydrate thereof.

Figure 2C:
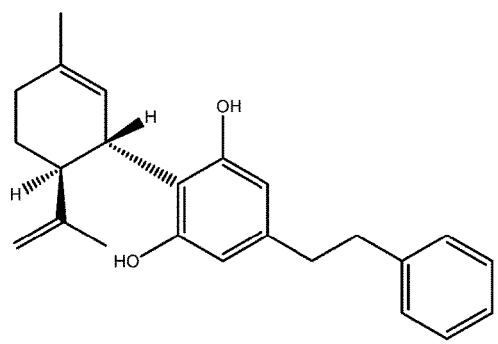
FIG. 2c illustrates the (+) trans isomer.

In one embodiment, the compound of the present invention may be (1'S,2'S)-5'-methyl-4-phenethyl-2'-(prop-1-ene-2-yl)-1',2',3',4'-tetrahydro-[1,1'-biphenyl]-2,6-diol) ((+)-cis-CBD-PET) (FIG. 2c)

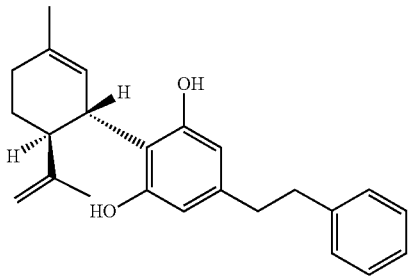 [SMILES: C=C(C)[C@H]1CCC(C)=C[C@@H]1c1c(O)cc(CCc2ccccc2)cc1O]

or a pharmaceutically acceptable salt or hydrate thereof.

Figure 2D:
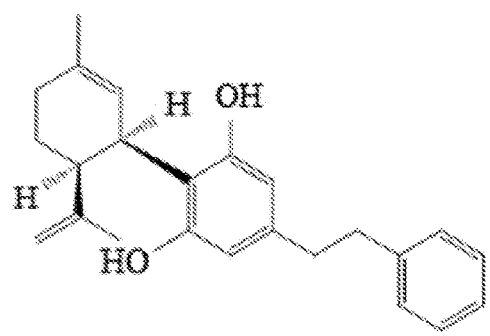
FIG. 2d illustrates the (−) cis isomer.

In one embodiment, the compound of the present invention may be (1'R,2'S)-5'-methyl-4-phenethyl-2'-(prop-1-ene-2-yl)-1',2',3',4'-tetrahydro-[1,1'-biphenyl]-2,6-diol ((−) cis-CBD-PET) (FIG. 2d) OH HO

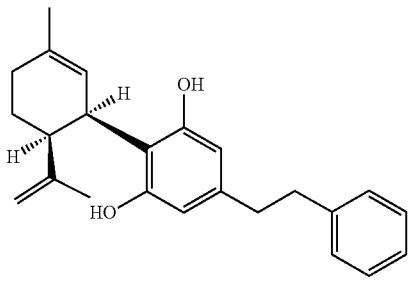 [SMILES: C=C(C)[C@H]1CCC(C)=C[C@H]1c1c(O)cc(CCc2ccccc2)cc1O]

or a pharmaceutically acceptable salt or hydrate thereof.

Figure 2E:
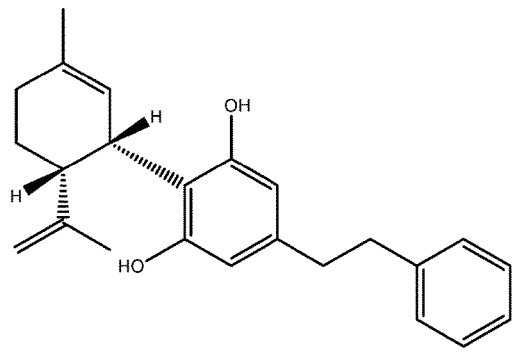
FIG. 2e illustrates the (+) cis isomer.
Figure 2F:
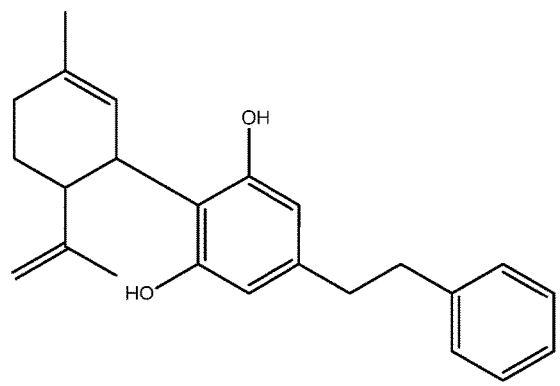
FIG. 2f illustrates CBD-PET with no stereochemistry.

In one embodiment, the compound of the present invention may be (1'S,2'R)-5'-methyl-4-phenethyl-2'-(prop-1-ene-2-yl)-1',2',3',4'-tetrahydro-[1,1'-biphenyl]-2,6-diol) ((+)-cis-CBD-PET) (FIG. 2e)

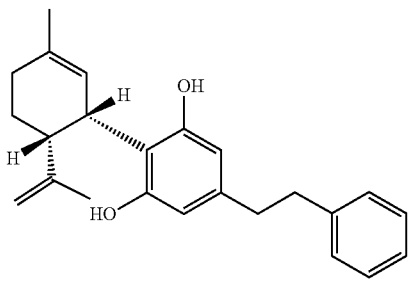 [SMILES: C=C(C)[C@@H]1CCC(C)=C[C@@H]1c1c(O)cc(CCc2ccccc2)cc1O]

or a pharmaceutically acceptable salt or hydrate thereof.

In one embodiment, the compound of the present invention may be (1'R,2'R)-4-(4-hydroxyphenethyl)-5'-methyl-2'-(prop-1-ene-2-yl)-1',2',3',4'-tetrahydro-[1,1'-biphenyl]-2,6-diol ((−) trans-CBD-PET-OH) (FIG. 3b)

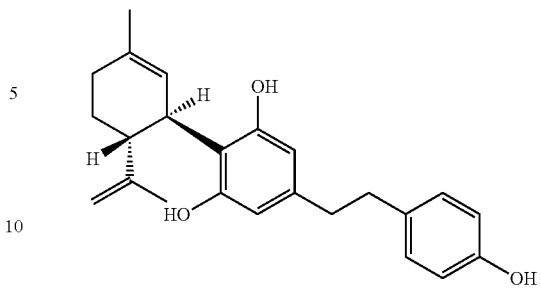

or a pharmaceutically acceptable salt or hydrate thereof.

In one embodiment, the compound of the present invention may be (1'S,2'S)-4-(4-hydroxyphenethyl)-5'-methyl-2'-(prop-1-ene-2-yl)-1',2',3',4'-tetrahydro-[1,1'-biphenyl]-2,6-diol ((+) cis CBD-PET-OH) (FIG. 3c)

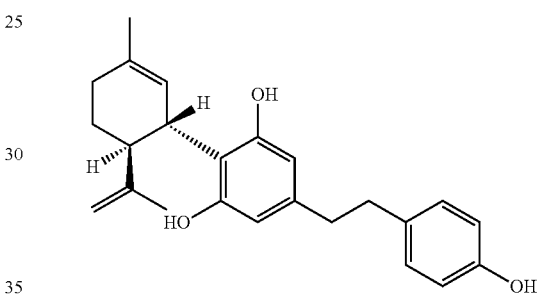

or a pharmaceutically acceptable salt or hydrate thereof.

In one embodiment, the compound of the present invention may be (1'R,2'S)-4-(4-hydroxyphenethyl)-5'-methyl-2'-(prop-1-ene-2-yl)-1',2',3',4'-tetrahydro-[1,1'-biphenyl]-2,6-diol ((−) cis-CBD-PET-OH) (FIG. 3d)

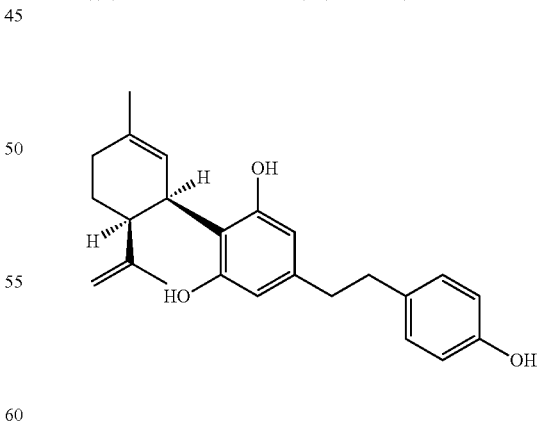

or a pharmaceutically acceptable salt or hydrate thereof.

In one embodiment, the compound of the present invention may be (1'S,2'R)-4-(4-hydroxyphenethyl)-5'-methyl-2'-(prop-1-ene-2-yl)-1',2',3',4'-tetrahydro-[1,1'-biphenyl]-2,6-diol ((+) cis CBD-PET-OH) (FIG. 3e)

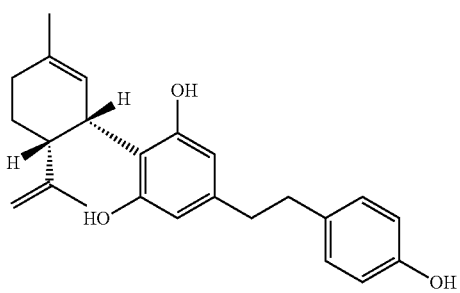 [SMILES: C=C(C)[C@@H]1CCC(C)=C[C@@H]1c1c(O)cc(CCc2ccc(O)cc2)cc1O]

or a pharmaceutically acceptable salt or hydrate thereof.

In one embodiment, the compound of the present invention may be any one or at least one of the followings:

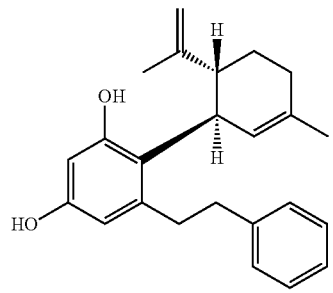

(-)-trans-CBD-PET ortho isomer
(1'R,2'R)-5'-methyl-6-phenethyl-2'-(prop-1-en-2-yl)-
1',2',3',4'-tetrahydro-[1,1'-biphenyl]-2,4-diol

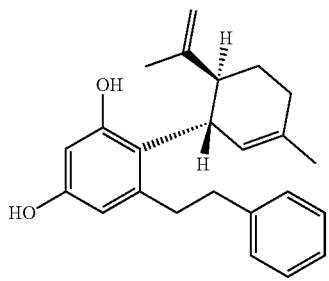

(+)-trans-CBD-PET ortho isomer
(1'S,2'S)-5'-methyl-6-phenethyl-2'-(prop-1-en-2-yl)-
1',2',3',4'-tetrahydro-[1,1'-biphenyl]-2,4-diol

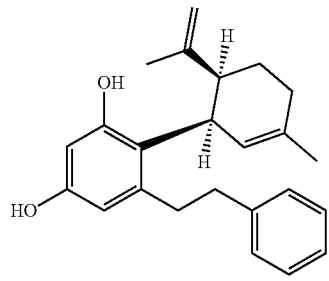

(-)-cis-CBD-PET ortho isomer
(1'R,2'S)-5'-methyl-6-phenethyl-2'-(prop-1-en-2-yl)-
1',2',3',4'-tetrahydro-[1,1'-biphenyl]-2,4-diol

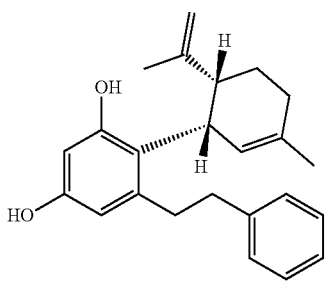

(+)-cis-CBD-PET ortho isomer
(1'S,2'R)-5'-methyl-6-phenethyl-2'-(prop-1-en-2-yl)-
1',2',3',4'-tetrahydro-[1,1'-biphenyl]-2,4-diol In one embodiment, the compound of the present invention may be any one or at$^{PGP}$-5$^7$,C$^2$,M least one of the followings:

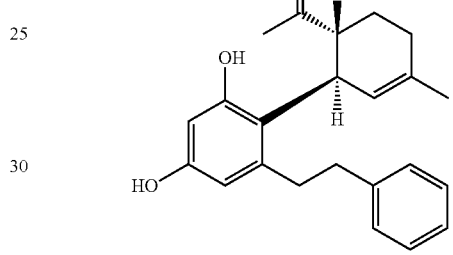

(-)-trans-CBD-PET ortho isomer
(1'R,2'R)-5'-methyl-6-phenethyl-2'-(prop-1-en-2-yl)-
1',2',3',4'-tetrahydro-[1,1'-biphenyl]-2,4-diol

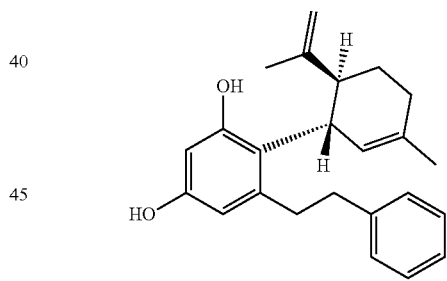

(+)-trans-CBD-PET ortho isomer
(1'S,2'S)-5'-methyl-6-phenethyl-2'-(prop-1-en-2-yl)-
1',2',3',4'-tetrahydro-[1,1'-biphenyl]-2,4-diol

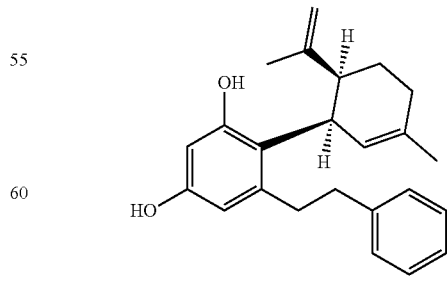

(-)-cis-CBD-PET ortho isomer
(1'R,2'S)-5'-methyl-6-phenethyl-2'-(prop-1-en-2-yl)-
1',2',3',4'-tetrahydro-[1,1'-biphenyl]-2,4-diol

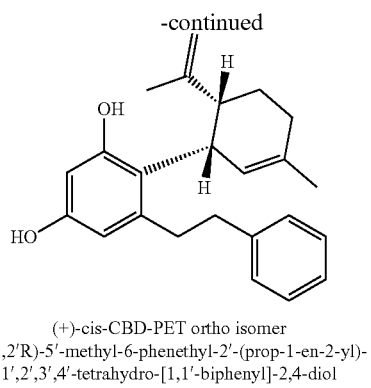

(+)-cis-CBD-PET ortho isomer
(1′S,2′R)-5′-methyl-6-phenethyl-2′-(prop-1-en-2-yl)-
1′,2′,3′,4′-tetrahydro-[1,1′-biphenyl]-2,4-diol or a pharmaceutically acceptable salt or hydrate thereof.

In one embodiment, the compound of the present invention may be (−)-trans-CBD-PET, or (−)-trans-CBD-PET-OH.

The compound of the present invention may be a substantially pure p isomer or a substantially pure o isomer. As used herein, substantially pure means that the isomer has a purity of at least 90%, at least 91%, at least 92%, at least 93%, at least 94%, at least 95%, at least 96%, at least 98%, more preferably still at least 98%, and most preferably still at least 99%. The compound of the present invention may be a mixture of both p and o isomers. When in the mixture of p and o isomers, each of the two isomers forming the mixture are together present a purity of at least 90%, at least 91%, at least 92%, at least 93%, at least 94%, at least 95%, at least 96%, at least 98%, more preferably still at least 98%, and most preferably still at least 99%, preferably, at greater than 95% purity.

Examples of the pharmaceutically acceptable salt of the compound of the present invention include alkali metal salts such as salts of sodium, potassium and lithium; alkaline earth metal salts such as salts of calcium and magnesium; metal salts such as salts of aluminum, iron, zinc, copper, nickel, cobalt, etc.; ammonium salts; organic amine salts such as salts of t-octylamine, dibenzylamine, morpholine, glucosamine, phenylglycine alkyl ester, ethylenediamine,N-methylglucamine, guanidine, diethylamine, triethylamine, dicyclohexylamine,N,N′-dibenzylethylenediamine, chloroprocaine, procaine, diethanolamine,N-benzylphenethylamine, piperazine, tetramethylammonium, tris(hydroxymethyl) aminomethane; hydrohalide salts such as salts of hydrofluorates, hydrochlorides, hydrobromides and hydroiodides; inorganic acid salts such as nitrates, perchlorates, sulfates, phosphates, etc.; lower alkane sulfonates such as methanesulfonates, trifluoromethanesulfonates and ethanesulfonates; arylsulfonates such as benzenesulfonates and p-toluenesulfonates; organic acid salts such as acetates, malates, fumarates, succinates, citrates, tartarates, oxalates, maleates, etc.; and, amino acid salts such as salts of glycine, lysine, arginine, ornithine, glutamic acid and aspartic acid. These salts may be produced by known methods. Alternatively, the compound of the present invention contained in the composition of the present invention may be in the form of a hydrate thereof.

Medical Use

The compound is useful for treating multiple conditions as demonstrated in the examples. Thus, the present invention provides the compound of the present invention for use in a medicine. In particular, for treating acondition which is seizure or epilepsy, the present invention provides the followings:

(a) A pharmaceutical composition for treating a condition which is seizure or epilepsy in a patient, comprising the compound of the present invention, i.e. CBD-PET and/or CBD-PET-OH, and/or a pharmaceutically acceptable salt or hydrate thereof.

(b) A method for treating a condition which is seizure or epilepsy in a patient, comprising administering to the patient a therapeutically effective amount of the compound of the present invention, i.e. CBD-PET and/or CBD-PET-OH, and/or a pharmaceutically acceptable salt or hydrate thereof.

(c) The compound of the present invention, i.e. CBD-PET and/or CBD-PET-OH, and/or a pharmaceutically acceptable salt or hydrate thereof, for use in the treatment of a condition which is seizure or epilepsy in a patient.

(d) Use of the compound of the present invention, i.e. CBD-PET and/or CBD-PET-OH, and/or a pharmaceutically acceptable salt or hydrate thereof in manufacturing a medicine for treating a condition which is seizure or epilepsy in a patient.

In one embodiment, the pharmaceutical composition of (a) may further comprise a pharmaceutically acceptable excipient. The term "pharmaceutically acceptable excipient" herein includes any substance used as a vehicle for delivery of the active ingredient to a subject, and any substance added to the active ingredient, for example to improve its handling properties or to permit the resulting composition to be formed into an orally deliverable unit dose having the desired shape and consistency. Excipients can include, by way of illustration and not by limitation, diluents, disintegrants, binding agents, adhesives, wetting agents, lubricants, glidants, substances added to mask or counteract a bad taste or odour, flavours, dyes, substances added to improve appearance of a dosage form, and any other substance other than the active ingredient conventionally used in the preparation of oral dosage forms.

In one embodiment, for the pharmaceutical composition of (a), the method of (b), the compound for use according to (c), or the use of (d), the condition to be treated may be generalised epilepsy, or Juvenile myoclonic epilepsy, Lennox-Gastaut syndrome or Progressive myoclonic epilepsy.

In another embodiment, for the pharmaceutical composition of (a), the method of (b), the compound for use according to (c), or the use of (d), the condition to be treated may be myoclonic seizure, a clonic seizure, tonic seizure or tonic-clonic seizure.

For the pharmaceutical composition of (a), the method of (b), the compound for use according to (c), or the use of (d), the administration may be determined by the skilled person depending on the specific conditions to be treated and patients. Exemplary routes include intravenous administration, intraarterial administration, intramuscular administration, subcutaneous administration, oral administration, tissue administration, transdermal administration, etc. In one embodiment, the composition of the present invention of (a) or for the compound of the present invention may be administered through parenteral, oral, nasal including nasogastric, ocular, transmucosal or transdermal routes.

Also, dosage forms which are available for the composition of the present invention of (a) or for the compound of the present invention are not particularly limited, and include, for example, infusions, injections, oral agents, drips, creams, inhalations, ointments, lotions, etc.

The patients to be treated by the pharmaceutical composition of (a), the method of (b), the compound for use according to (c), or the use of (d) are not particularly limited, however, include human, domestic animals such as cows, sheep, horses, goats, lamas, kangaroos and pigs, pet animals such as dogs, cats, rabbits and birds and zoo animals such as lions, elephants, giraffes and bears. In one embodiment, the patient to be treated is a human.

An appropriate dose for the compound of the present invention to be administered can be determined by the skilled person based on the description and data provided herein. The guidance of the conversion of appropriate doses for animal models to appropriate ones for human is known to the skilled person. An example of such dose conversion is provided in Guidance for Industry Estimating the Maximum Safe Starting Dose in Initial Clinical Trials for Therapeutics in Adult Healthy Volunteers (U.S. Department of Health and Human Services Food and Drug Administration Center for Drug Evaluation and Research (CDER), July 2005 Pharmacology and Toxicology). Specifically, the dose of 200 mg/Kg for a mouse for CBD-PET and CBD-PET-OH equates to a human equivalent dose of 200×0.08=16 mg/Kg or for an "average" adult weighing 60 Kg, a dose of 960 mg. Based on this early data one might anticipate a human dose to be in the order of from 8 mg/Kg to 32 mg/Kg or as a dose for a 60 Kg patient from 480 mg to 1920 mg or intermediate values therebetween such as, 12 mg/Kg to 24 mg/Kg or as a dose for a 60 Kg patient from 720 mg to 1440 mg. Doses for heavier human patients or for lighter patients such as children can appropriately be determined based on the disclosure provided herein. In one embodiment, the compound of the present invention may be administered to the patient at a dose of at least 8 mg/Kg.

The pharmaceutical composition of (a) may further comprise a pharmaceutically acceptable carrier. A concentration of the compound of the present invention contained in the pharmaceutical composition of (a) may vary depending on kind of the carrier, etc., and is appropriately in a range of 0.1 nM to 100 µM, preferably in a range of 1 nM to 10 µM, and more preferably in a range of 10 nM to 1 µM.

In addition to the compound of the present invention, the pharmaceutical composition of (a) may further comprise one or more pharmaceutically acceptable additives. Examples of such additives are emulsification aids (e.g., fatty acids having 6 to 22 carbon atoms and their pharmaceutically acceptable salts, albumin and dextran), stabilizers (e.g., cholesterol and phosphatidic acid), isotonizing agents (e.g., sodium chloride, glucose, maltose, lactose, sucrose, trehalose), and pH controlling agents (e.g., hydrochloric acid, sulfuric acid, phosphoric acid, acetic acid, sodium hydroxide, potassium hydroxide and triethanolamine). One or more of these additives can be used. The content of the additive in the composition of the present invention is appropriately 90 wt % or less, preferably 70 wt % or less and more preferably, 50 wt % or less.

Synthetic Method

The present invention provides a synthetic method of manufacturing a perrottetinene-like compound such as the compound of the present invention comprising (the steps of) reacting menthadienol with dihydropinosylvin or dihydroresvratrol, e.g. in the presence of a Lewis acid. The step (hereinafter referred to as the "alkylation step") allows the alkylation of menthadienol with dihydropinosylvin or dihydroresvratrol, thereby producing a perrottetinene-like compound.

In one embodiment, the perrottetinene-like compound produced by the method of the present invention is (1'R,2'R)-5'-methyl-4-phenethyl-2'-(prop-1-ene-2-yl)-1',2',3',4'-tetrahydro-[1,1'-biphenyl]-2,6-diol (CBD-PET) Wmnmenthadienol is reacted with Dihydropinosylvin. In one embodiment, the perrottetinene-like compound produced by the method of the present invention is (1'R,2'R)-4-(4-hydroxyphenethyl)-5'-methyl-2'-(prop-1-ene-2-yl)-1',2',3',4'-tetrahydro-[1,1'-biphenyl]-2,6-diol (CBD-PET-OH) vnmenthadienol is reacted with dihydroresvratrol. In one embodiment, menthadienol is a para (p-) menthadienol.

The Lewis acid used can be selected from the group consisting of $H^+$, $K^+$, $Zn^{2+}$, $Mg^{2+}$, Fee, $BF_3$, $Sc^{3+}$, $CO_2$ $SO_3$, RMgX (wherein R is a hydrocarbon radical such as $CH_3$, $C_2H_5$ or $C_6H_5$ and X is a halogen atom such as chlorine, bromine or iodine), $AlCl_3$ and $Br_2$. Further examples of the Lewis acids used in the method include $Zn(OTf)_2$, p-TsOH·$H_2O$, $BF_3OEt_2$, $BF_3OEt_2$—$Al_2O_3$; and $Sc(OTf)_3$. In one embodiment, the Lewis acid used in the synthetic method may be a zinc (or BF3)-containing or -based acid. In a further embodiment, the zinc based acid may comprise zinc triflate ($Zn(OTf)_2$).

In one embodiment, the initial, or starting, amount of the Lewis acid (to be added in the alkylation step) may be 0.005-0.10, 0.005-0.09, 0.005-0.08, 0.005-0.07, 0.005-0.06, 0.005-0.05, 0.005-0.04, 0.005-0.03, 0.005-0.025, 0.01-0.10, 0.01-0.09, 0.01-0.08, 0.01-0.07, 0.01-0.06, 0.01-0.05, 0.01-0.04, 0.01-0.03, 0.01-0.025, 0.015-0.10, 0.015-0.09, 0.015-0.08, 0.015-0.07, 0.015-0.06, 0.015-0.05, 0.015-0.04, 0.015-0.03 or 0.015-0.025 mole equivalent to menthadienol. In one embodiment, the initial amount of the Lewis acid to be added in the alkylation step may be 0.02 mole equivalent to menthadienol.

In one embodiment, the alkylation step, i.e. the reaction of menthadienol with dihydropinosylvin or dihydroresvratrol, takes place at or under the temperature ranging 60-140° C., 60-130° C., 60-120° C., 70-140° C., 70-130° C., 70-120° C., 80-140° C., 80-130° C., 80-120° C., 90-110° C. or 95-105° C. In one embodiment, the alkylation step takes place under the temperature ranging 80-120° C. In one embodiment, the alkylation step takes place under the temperature of 100° C.

When the perrottetinene-like compound produced by the method of the present invention is (1'R,2'R)-4-(4-hydroxyphenethyl)-5'-methyl-2'-(prop-1-ene-2-yl)-1',2',3',4'-tetrahydro-[1,1'-biphenyl]-2,6-diol (CBD-PET-OH), the method of the present invention may further comprise the step of producing dihydroresvratrol by hydrogenating trans-resveratrol in the presence of palladium on carbon (Pd/C).

The first step was to make CBD-PET, and CBD-PET-OH.

Figure 1:
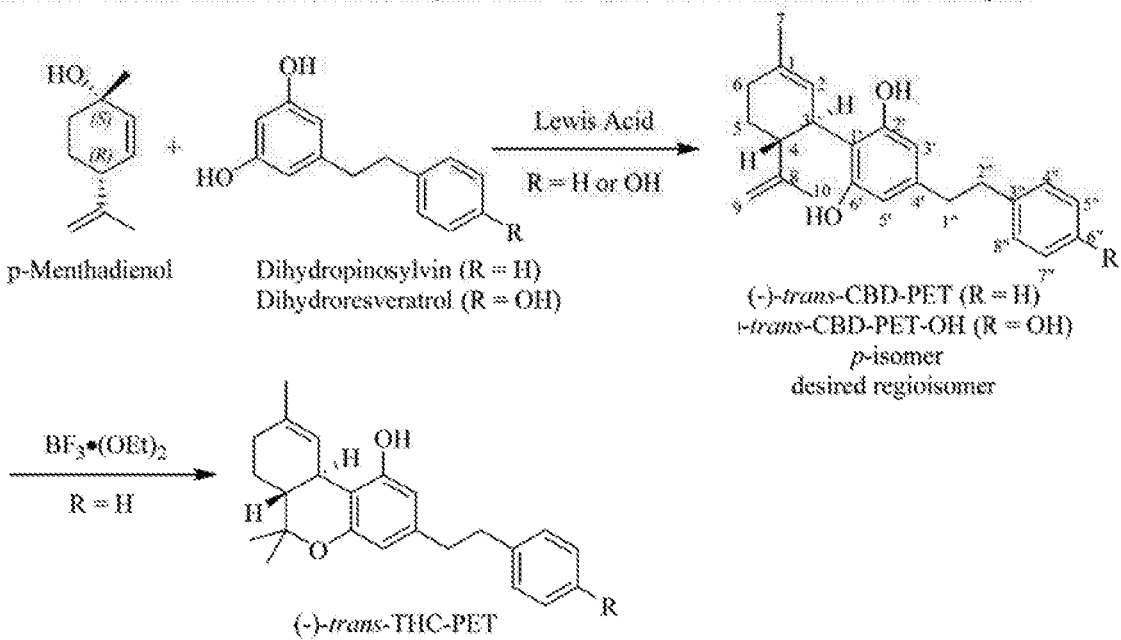
FIG. 1 is a general scheme for synthesis of CBD-PET and analogues including, but not. limited to a hydroxy substituted variant and subsequent ring closure to produce THC-PET and THC-PET-OH.

The compounds of the invention were produced by way of the general scheme illustrated in FIG. 1 and respectively the schemes and compounds shown in FIG. 2a-f and FIG. 3a-f.

General Methodology

A key step in the preparation of the initial target compounds:
i) (−) trans CBD-PET, and
ii) (−) transCBD-PET-OH
was a Friedel-Crafts alkylation of p-menthadienol, suitably with the required resorcinol/biphenyl compound.

Dihydropinosylvin was commercially available but dihydroresveratrol required hydrogenation of the readily available resveratrol under standard conditions. The process described in FIG. 1—Scheme 1 produces nearly equal amounts of the p and o-isomers and required extensive chromatographic effort to separate the them from one another as well as from other minor side products.

Finally, the synthesis of (−)-trans-THC-PET was carried out by the boron trifluoride diethyl etherate-mediated cyclization of (−)-trans-CBD-PET to affect the formation of the pyran ring.

Hereinafter, the present invention will be described in more detail with reference to EXAMPLES below, but is not deemed to be limited thereto.

Example 1—Preparation of (−) Trans CBD-PET

The initial preparation of (−) trans CBD-PET was based on the use of a number of different Lewis acids including:
Zn(OTf)$_2$;
p-TsOH·H$_2$O;
BF3OEt$_2$;
BF$_3$OEt$_2$-Al$_2$O3; and
Sc(OTf)$_3$
and reaction conditions for the coupling of dihydropinosylvin with p-menthadienol based on published reports (FIG. 2—Scheme 2).

The use of the original Crombie et al. conditions (p-TsOH·H$_2$O in toluene); Ref: J. Chem. Soc.Perkin. Trans I, 1988, 1263-1270 were carried out but afforded only 25% of the selected (−)-trans-CBD-PET (p-isomer) along with 10% of the alternative o-isomer.

Boron trifluoride diethyl etherate (BF3·OEt$_2$), a commonly used Lewis acid for this conversion, and BF$_3$·OEt$_2$-alumina (Ref: Tet. Lett. 1985, 26, 1083-1086) were examined and found to give less than 30% yield of the desired product. The alumina-mediated conditions produced an unknown isomeric compound which did not match the 1H NMR of any of the compounds reported in the literature.

The use of Sc(OTf)$_3$ (Ref: WO2007041167) at either 20° C. or below 0° C. gave yields comparable to the p-TsOH and BF$_3$·OEt$_2$ as well as the alternative o-isomer.

Use of Zn(OTf)$_2$ in toluene at 100° C., with an excess of dihydropinosylvin (see WO2019046806) gave complete consumption of p-menthadienol but some dihydropinosyNvin remained. LCMS analysis showed the presence of multiple peaks with m/z=349 corresponding to the desired product as well as several peaks with m/z=497 matching the bis-alkylated side products. After flash chromatography purification, two major spots were isolated and characterized. The less polar spot was identified as the desired (−)-trans-CBD-PET (p-isomer) and the more polar spot was confirmed as the o-isomer of (−)-trans-CBD-PET based on their 1H NMR spectra that matched the published data (Crombie et at; J. Chem. Soc. Perkin. Trans I, 1988, 1263-1270). This initial reaction provided 42% of desired p isomer and 39% of the o isomer.

This Lewis acid, Zn(OTf)$_2$ proved to be significantly more efficient than the others referenced in the literature and was used in production.

Preparation of (−)-Trans-CBD-PET for In Vivo Testing

A 2-L, three-neck reactor was equipped with a magnetic stirrer, reflux condenser, thermocouple, and nitrogen inlet. Dihydropinosylvin (116.1 g, 0.54 mol, 1.10 equiv) was charged into the reactor as solid under nitrogen atmosphere followed by toluene (750 mL, 10 vol). The resulting solution was heated to 80° C. for 20 min and then Zn(OTf)$_2$ (3.6 g, 0.010 mol, 0.020 equiv) followed by p-menthadienol (75.0 g, 0.490 mol, 1.00 equiv) in toluene (375 mL, 5.0 vol). The reaction mixture was then heated to 100'C and the progress was monitored by TLC. After 1 h at 100° C., complete consumption of p-menthadienol was observed and the batch was cooled to 50-55° C. The reaction was quenched by slow (5-10 min) addition of water (150 mL) and then cooled to 20° C. The mixture was stirred for an additional 5-10 min at 20° C. before allowing the layers to separate. The aqueous layer was discarded, and the organic solvent was removed under reduced pressure. The resultant crude oil was purified by flash column chromatography on silica gel (Biotage KP-SIL 75-L cartridge; 1 kg of silica) in two batches eluting slowly with 0-30% EtOAc/heptanes [Gradient: 1×2 L of 100% heptanes; 1×2 L 5% EtOAc-heptanes; 1×2 L 12% EtOAc-heptanes (p-isomer elution start); 2×2 L 10% EtOAc-heptanes (p-isomer elution end); 1×2 L 15% EtOAc-heptanes; 1×2 L 20% EtOAc-heptanes (o-isomer elution start); 1×4 L 25% EtOAc-heptanes (o-isomer elution end)].

Figure 7:
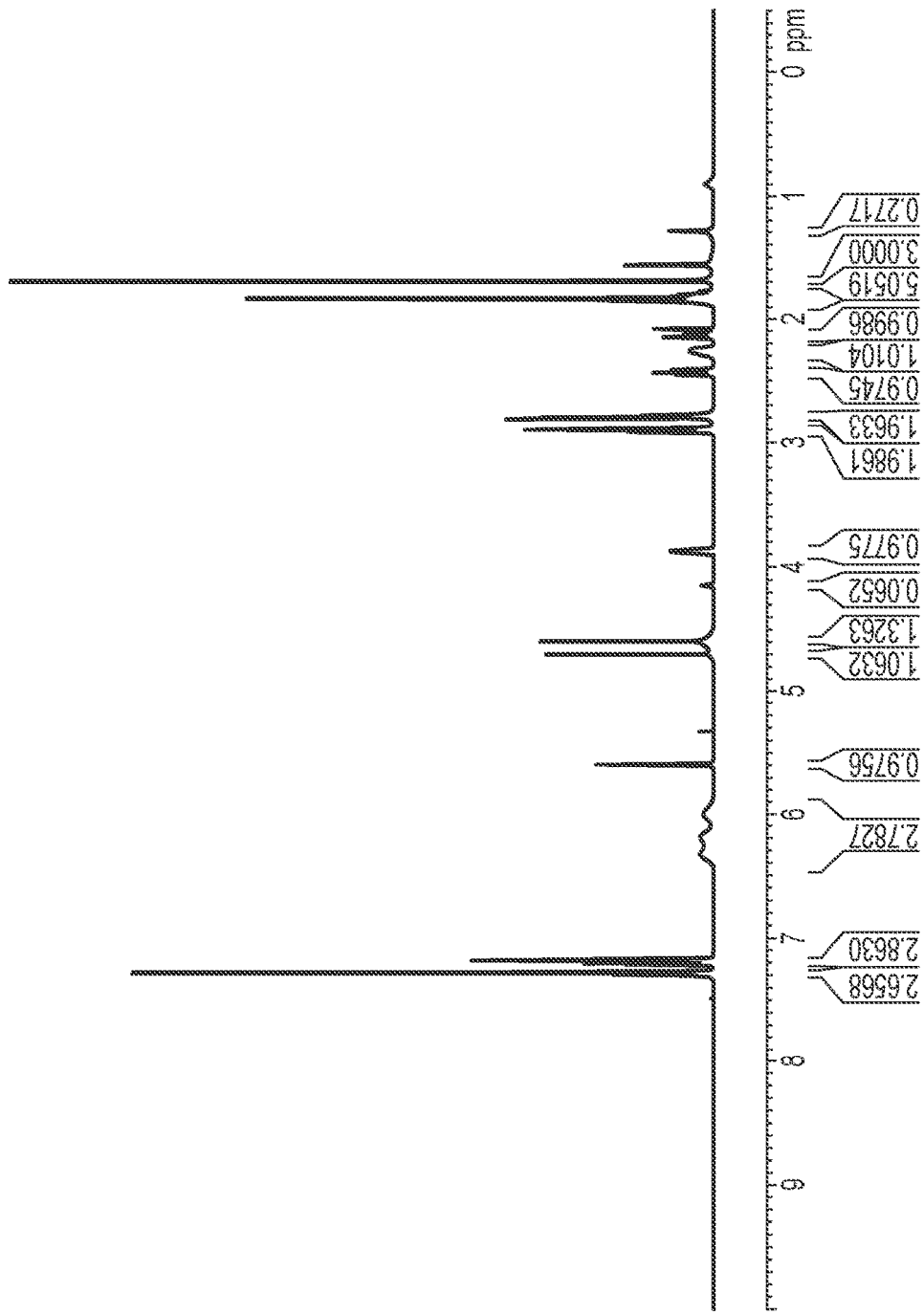
FIG. 7 is HPLC data for (−)-trans-CBD-PET (p isomer)
Figure 8:
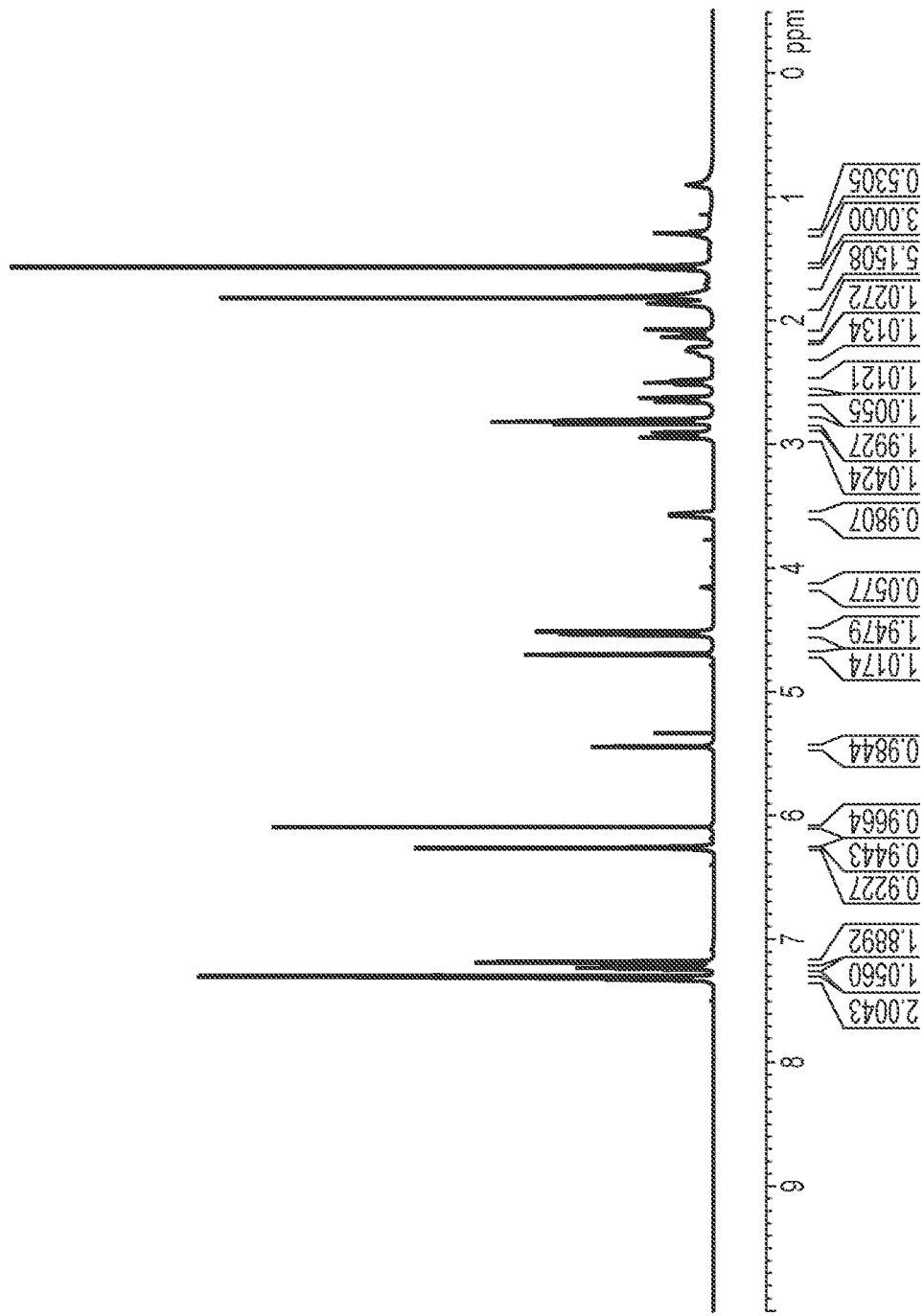
FIG. 8 is HPLC data for (−)-trans-CBD-PET (o isomer)

The fractions containing product (p-isomer) were combined and solvents were removed under reduced pressure to give 60 g (−)-trans-CBD-PET with 94% purity as a clear viscous oil. This material was further purified by Combiflash (HP silica gel, 330 g gold cartridge) chromatography in three batches to afford (−)-trans-CBD-PET (40.3 g, 24% yield; lot #GSR-D-31-1—FIG. 7) with an HPLC purity of 99.3%. The fractions from the Biotage column which contained the o-isomer were pooled and concentrated under reduced pressure to give a clear viscous oil of o-(−)-trans-CBD-PET (57.9 g, 34% yield; lot #GSR-D-31-2 -FIG. 8) with a purity of 99.1%). The identities were confirmed by $_1$H and $_{13}$C NMR (500 MHz, CDCl3) after drying the material for over 60 h under high vacuum.

Example 2—Preparation of—Trans CBD-PET-OH

The Zn(OTf)$_2$ conditions utilized above for the preparation of CBD-PET were adapted to synthesize the 4-hydroxyphenethyl analogue (CBD-PET-OH; (1'R,2'R)-4-(4-hydroxyphenethyl)-5'-methyl-2'-(prop-1-ene-2-yl)-1',2',3',4'-tetrahydro-[1,1'-biphenyl]-2,6-diol, FIG. 3—Scheme 3). Commercially available resveratrol (1.0 equiv) was hydrogenated in the presence of 10% Pd—C(2 wt %) using the reported procedure (US20160367498) resulting in a complete and clean conversion of resveratrol to dihydroresveratrol In the initial coupling attempt, treatment of dihydroresveratrol (0.5 g) with p-menthadienol in the presence of Zn(OTf)2 (0.02 equiv) under identical conditions showed a similar TLC reaction profile with complete consumption of the p-menthadienol in one hour. LCMS analysis of the isolated crude confirmed the presence of two peaks with m/z=365 (M+1) representing the desired product (p-isomer) and by-product (o-isomer) in addition to two additional peaks with m/z=499, indicative of dialkylated products. The crude (-)-trans-CBD-PET-OH was purified by silica get chromatography, eluting with 0-40% EtOAc/heptanes to afford (−)-trans-CBD-PET-OH (37% yield) and the alternative o-isomer of (−)-trans-CBD-PET-OH (28% yield) as clear viscous oils. The structures of the isomers were assigned based upon comparison of their NMR spectra to the reports in the literature (Crombie et at; J. Chem. Soc. Perkin. Trans 1, 1988, 1263-1270). The key distinguishing feature of the 1H NMR spectra of the selected p-isomer was the broadened signals of 3' and 5' protons due to slow exchange involving the rotation of p-menthadienol core (see Scheme 1 for atom numbering). Similarly, the corresponding carbon atoms also showed broadened peaks in the 13C NMR along with significantly diminished peak heights. Consistent with the literature, no such exchange or broadening of proton or carbon signals were observed with the more hindered, and o-regioisomer.

Preparation of (−)-Trans-CBD-PET-OH for In Vivo Testing

Step 1: Preparation of Dihydroresveratrol

To a solution of trans-resveratrol (75.0 g, 0.33 mol, 1.00 equiv) in EtOH (1120 mL, 15 vol) in a metal pressure reactor was charged 10% Pd/C (1.75 g, 0.0015 mol, 0.050 equiv). The flask was purged with nitrogen to create an inert atmosphere followed by purging with hydrogen gas. The reaction mixture was stirred at 20° C. for 16 h under hydrogen (40 psi) atmosphere. Upon complete consumption of resveratrol, the mixture was filtered over a short pad of Celite to remove the Pd/C. The Celite pad was washed with additional EtOH [3×300 mL (2 vol)]. The combined filtrate was concentrated under reduced pressure to give a clear oil that became an off-white solid upon further drying under high vacuum. 1H NMR confirmed the identity of dihydroresveratrol (149.3 g, yield=98%) and matched the reported 1H NMR data in US20160367498.

Step 2: Preparation of (-)-Trans-CBD-PET-OH

Figure 9:
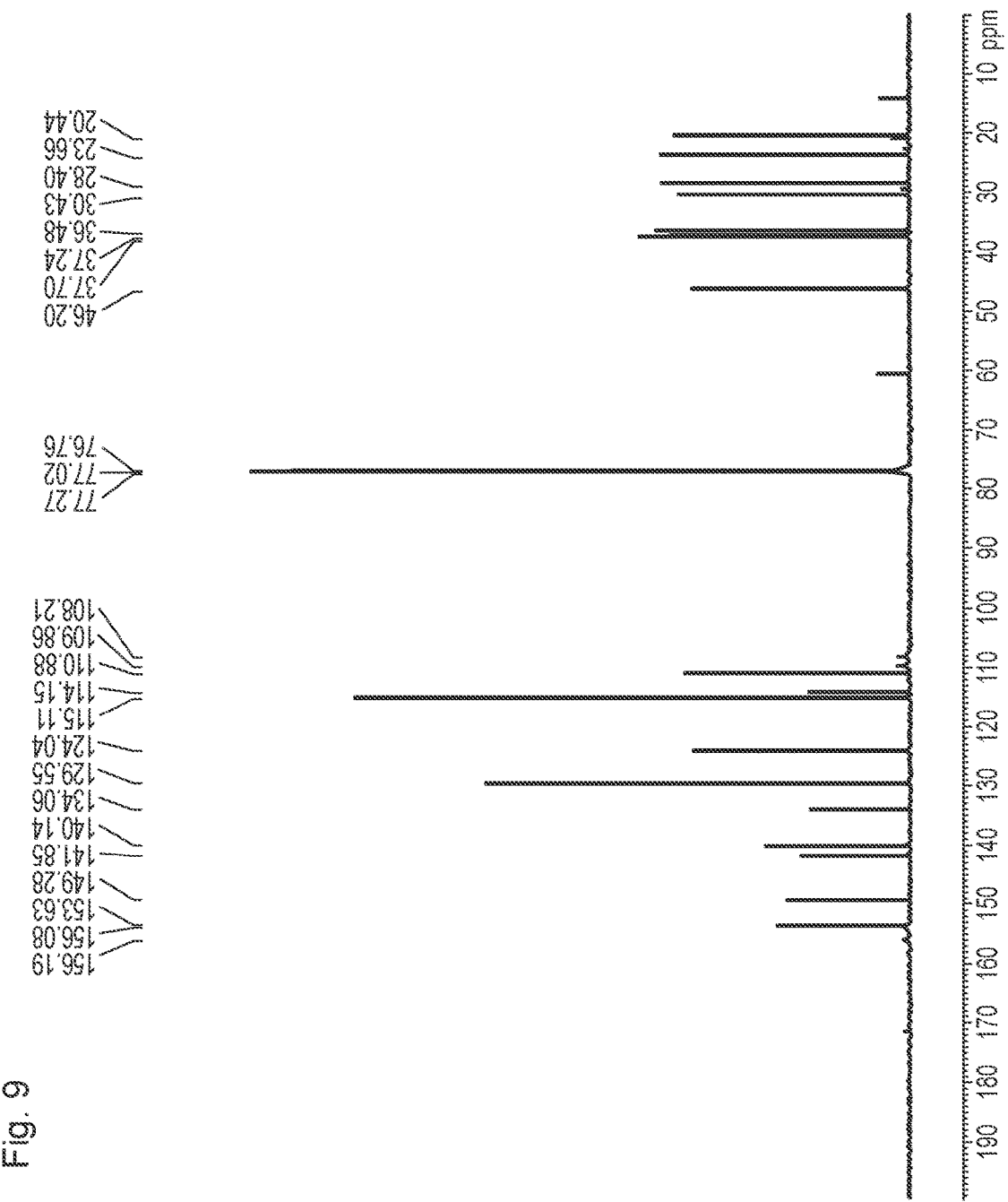
FIG. 9 is HPLC data for (−)-trans-CBD-PET-OH (p isomer)
Figure 10:
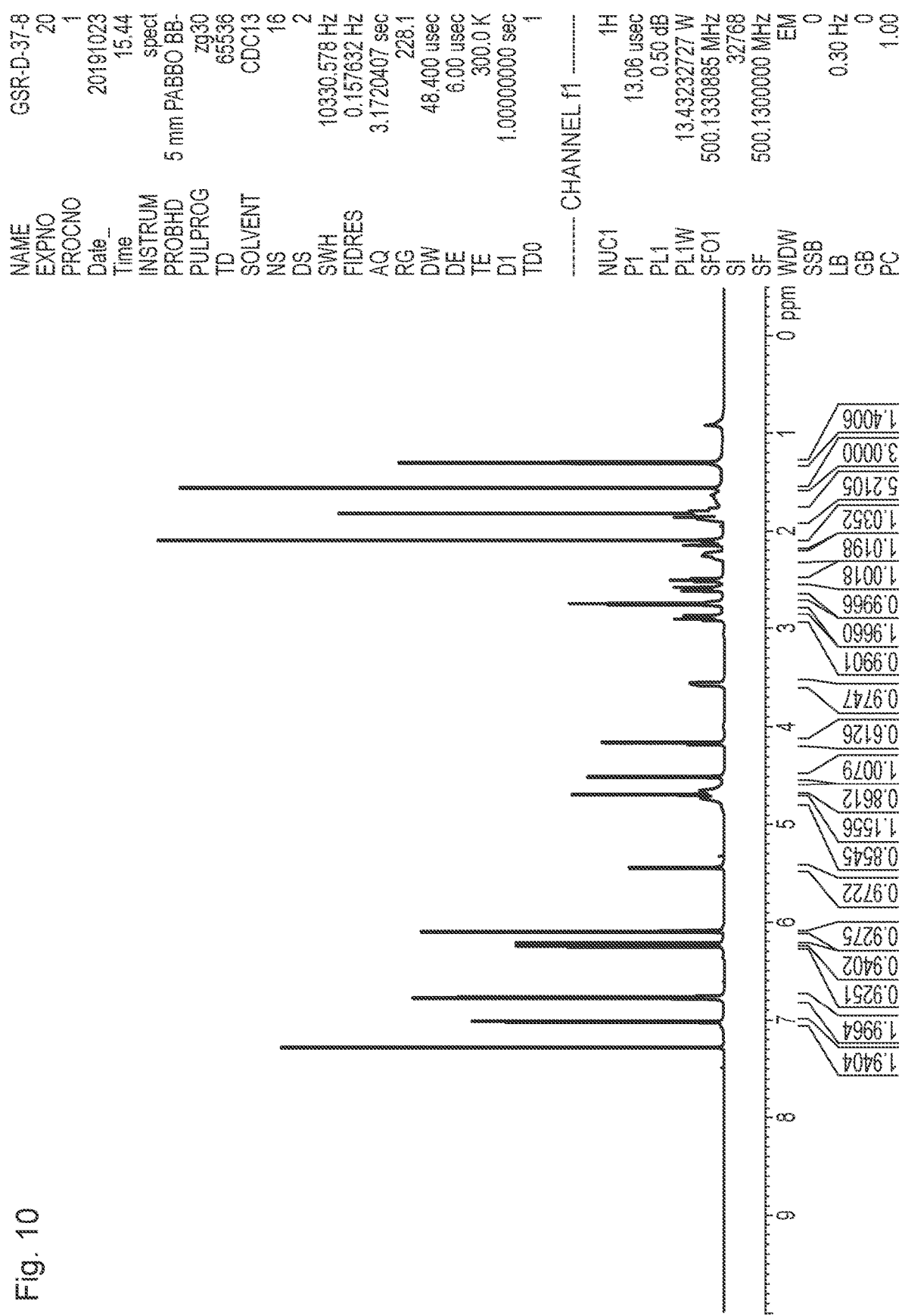
FIG. 10 is HPLC data for (−)-trans-CBD-PET-OH (o isomer).

A 2L three-neck reactor was equipped with magnetic stirrer, reflux condenser, thermocouple, and nitrogen inlet. Dihydroresveratrol (127 g, 0.550 mot, 1.10 equiv) was charged into the reactor as a solid under nitrogen atmosphere followed by toluene (800 mL). The mixture was heated to 80° C. for 20 min and charged $Zn(OTf)_2$ (3.84 g, 0.011 mol, 0.02 equiv) followed by p-menthadienol (80.0 g, 0.52 mot, 1.0 equiv) in toluene (400 mL). The reaction mixture was then heated to 95-100'C and the progress was monitored by TLC. After 1 h, TLC analysis showed complete consumption of p-menthadienol. The reaction mixture was cooled to 50-55° C. and quenched by the slow addition of water (160 mL). The batch was then further cooled to 20° C. The mixture was stirred for additional 5-10 min at 20° C. before letting the layers separate to collect the organic layer. The solvent was removed under reduced pressure. The crude divided into two batches and purified by flash chromatography using Biotage KP-SIL 75L columns eluting slowly with 0-30% EtOAc-heptanes [Gradient: 2×2 L of 100% heptanes; 2×2 L 10% EtOAc-heptanes; 2×2 L 12% EtOAc-heptanes; 3×4 L 15% EtOAc-heptanes (p-isomer elution); 2×4 L 20% EtOAc-heptanes (o-isomer elution); 1×4 L 25% EtOAc-heptanes; 1×2 L 30% EtOAc-heptanes]. The fractions containing product (p-isomer) were combined and solvents were removed under reduced pressure to afford p-)-trans-CBD PET-OH (39.3 g, 20% yield; lot #GSR-D-37-7) as a clear viscous oil with 97.4% purity by HPLC (FIG. 9). Similarly, the fractions containing the alternative o-isomer were pooled and concentrated under reduced pressure to give o-(-)-trans-CBD-PET-OH (43.9 g, 22% yield; tot #GSR-D-37-8) as a clear viscous oil with 99.3% purity by HPLC (FIG. 10). The identities were confirmed by 1H NMR and 13C NMR (500 MHz, CDCl3) after drying the material for over 60 h under high vacuum.

The two exemplary compounds:
A-(-)-trans-CBD-PET (p isomer); and
B-(-)-trans-CBD-PET-OH (p isomer)
were subjected to a PK study and tested in two exemplary seizure models, namely the PTZ and MES models of seizures.

Animals
Species: Mouse
Strain: ICR:CD-1
Source of Animals: Charles River
Age or weight: 8-10 weeks
Sex: Male
Randomization: Animals were assigned randomly to treatment groups
Blinding of Study: The investigators were blinded to treatments.
Housing and Feeding
Acclimation/Conditioning
Not less than three days Housing:
Mice will be housed on a 12 hr light/dark cycle (lights on 7:00 AM)
No more than 4 mice per cage depending on size
Ventilated cage rack system
Diet:
Standard rodent chow and water ad libitum
Design Parameters
PK Study
Route(s) of administration: Intraperitoneal (i.p.)
Dose Volume(s): 10 ml/kg
Formulation(s):
Vehicle for the test compounds and CBD: 1:1:18 ethanol: cremophor (Kolliphor) EL:
0.9% saline
Dose Levels: 100 mg/kg
Dose Frequency: Once
Study duration: 1 day
Time points for blood collection:
IP administration: 0.5 h (30 min), 1 h, 2 h,
Number of animals per group: 3
Number of samples for analyses:
9 blood samples per compound
18 samples total
Total number of animals: 6
The above is summarised in Table 1 below:

TABLE 1

| Animal Group | Route | Compound | Dose | Volume | Blood Collection Times | Number of Mice |
|---|---|---|---|---|---|---|
| 1 | IP | (-)-trans-CBD—PET | 100 mg/kg | 10 mL/kg | 0.5 h, 1 h, 2 h | 3 |
| 2 | IP | (-)-trans-CBD—PET—OH | 100 mg/kg | 10 mL/kg | 0.5 h, 1 h, 2 h | 3 |

Conversion of a mouse dose to a human equivalent dose, in mg/Kg, is by multiplying the mouse dose by 0.08.

MES Study
Route(s) of administration: Intraperitoneal (i.p.) and per oral (p.o.) (Phenytoin
Dose Volume(s): 10 ml/kg
Formulation(s):
Vehicle for the test compounds: 1:1:18 ethanol: cremophor (Kolliphor) EL: 0.9% saline
Vehicle for phenytoin: 0.5% MC in water
Dose Levels: 100-200 mg/kg (Table 2), Phenytoin 60 mg/kg
Dose Frequency: Once
Study duration: 1 day
Interval between dose and evaluation: 30 min for test articles and phenytoin, 60 min for CBD
Number of animals per group: 10
Number of groups: 5
Total number of animals: 50
The above is summarised in Table 2 below

TABLE 2

| Treatment | Group Size | Dose (mg/kg) | Route | Pretreatment Time | Evaluations/Endpoints |
|---|---|---|---|---|---|
| Vehicle | 10 | 0 | IP | 30 min | % of mice exhibiting |
| Phenytoin | 10 | 60 | PO | 30 min | seizure; Latency to |
| CBD | 10 | 100 | IP | 60 min | seizure |
| (-)-trans-CBD- PET | 10 | 200 | IP | 30 min | |
| (-)-trans-CBD- PET-OH | 10 | 200 | IP | 30 min | |

PTZ Study
Route(s) of administration: Intraperitoneal (i.p.) and per oral (p.o.) (Diazepam)
Dose Volume(s): 10 ml/kg
Formulation(s):
Vehicle for the test compounds: 1:1:18 ethanol: cremophor (Kolliphor) EL: 0.9% saline
Vehicle for diazepam: 0.5% MC, 0.1% Tween 80 in water
Dose Levels: 100-200 mg/kg (Table 3), Phenytoin 60 mg/kg
Dose Frequency: Once
Study duration: 1 day
Interval between dose and evaluation: 30 min for test articles and diazepam, 60 min for CBD
Number of animals per group: 10
Number of groups: 5
Total number of animals: 50
The above is summarised in Table 3 below:

TABLE 3

| Treatment | Group Size | Dose (mg/kg) | Route | Pretreatment Time | Evaluations/Endpoints |
|---|---|---|---|---|---|
| Vehicle | 10 | 0 | IP | 30 min | Latency to onset of clonic and then tonic seizure |
| Diazepam | 10 | 30 | PO | 30 min | |
| CBD | 10 | 100 | IP | 60 min | |
| (−)-trans-CBD-PET | 10 | 200 | IP | 30 min | |
| (−)-trans-CBD-PET-OH | 10 | 200 | IP | 30 min | |

Methods
PK Study
For testing of each compound, six CD-1 mice were divided into 2 groups of 3. Animals were administered test agents via i.p. route and blood collected at 30, 60 and 120 min, administration as outlined in Table 1. Blood samples were collected in EDTA-coated microfuge tubes, inverted and placed on an ice pack prior to centrifugation and storage at −70° C. Samples were extracted using an acetonitrile/protein precipitation method and levels of test agent analysed by LC/MS/MS.
Maximal Electroshock (MES)
Animals were administered vehicle, phenytoin, CBD or test compounds and gross behavioural observations were done for 30 minutes. Proparacaine hydrochloride ophthalmic solution (Butler AHS, Dublin, OH) was applied approximately 10 minutes prior to testing to numb the eyes. Thirty to sixty minutes after administration of vehicle, phenytoin, CBD or test compounds, 0.9% saline solution (sodium chloride in water) was applied to both eyes and electro-convulsions were produced by an alternating current delivered via corneal electrodes by a Rodent Shocker generator at a frequency of 60 Hz (Harvard Apparatus, Holliston, Mass.). Parameters for the ICR:CD1 mice were 0.2 s stimulus duration at an intensity of 25 mA. The criterion for seizure occurrence were presence of a tonic hind limb extension, defined as extension exceeding a 90-degree angle with the plane of the body. A 20-second cut-off latency was used for the mice that did not seize. Any seizure activity (i.e. clonic seizures defined as rapid spasms or jerky movements of the limbs) prior to tonic hind limb seizure were recorded as presence of seizure (noted as 1-yes, 0-no). After seizure exhibition or 20-second timeout, mice were euthanized via cervical dislocation.
PTZ-Induced Seizures
Mice were acclimated to the procedure room for at least 30 minutes. Pentylenetetrazole (PTZ; SigmaAldrich) was formulated in water to a concentration of 20 mg/ml. Injections of PTZ were made at a volume of 5 ml/kg to produce a final dose of 100 mg/kg. PTZ injections were i.p. Diazepam was formulated at a concentration of 2 mg/mL and administered at volume of 10 mL/kg to produce a final dose of 20 mg/kg. Time to initial myoclonic and tonic hindlimb extensor response was measured. A 10-min maximum latency to seizure was imposed.

Bioanalytical Method Development and Sample Bioanalysis

Bioanalytical detection method was developed using an LC/MS/MS (ABI 5000 or 5500). Standard curves of the test agent were prepared in an appropriate biological matrix (plasma). Levels of test article was measured in plasma as per the developed method.

Levels were determined by extrapolating the concentration from a standard curve using linear regression analysis. Method development and bioanalysis was performed by a partner company, Keystone Bioanalytical (North Wales, PA, US).

Data Analysis

The data was expressed as mean+SEM. Statistical analysis using one-way ANOVA with post-hoc Fisher's LSD test was used to determine statistical significance compared to the vehicle-treated animals.

Results PK Study

Animals were treated according to Table 1 and the time course of (−)-trans CBD-PET is illustrated in Table 4—Measured concentrations of (−)—trans CBD-PET in plasma (ng/ml) after administration of 100 mg/kg i.p.

TABLE 4

| Animal # | Time, Min | (−)-trans- CBD-PET in plasma (ng/ml) | Average (ng/ml) |
|---|---|---|---|
| 1 | 30 | 4028.9 | 3806.8 |
| 2 | | 3519.2 | |
| 3 | | 3872.3 | |
| 1 | 60 | 2729.5 | 2140.5 |
| 2 | | 1728.7 | |
| 3 | | 1963.2 | |
| 1 | 120 | 2188.6 | 1313.9 |
| 2 | | 770.3 | |
| 3 | | 982.7 | |

Animals were treated according to Table 1 and the time course of (−) trans CBD-PET-OH is illustrated in Table 5—Measured concentrations of (−)-trans CBD-PET-OH in plasma (ng/ml) after administration of 100 mg/kg i.p.

TABLE 5

| Animal # | Time, Min | (−)-trans- CBD-PET-OH in plasma (ng/ml) | Average (ng/ml) |
|---|---|---|---|
| 4 | 30 | 6521.7 | 8118.4 |
| 5 | | 8897.4 | |
| 6 | | 8936.2 | |
| 4 | 60 | 8877.8 | 7924.3 |
| 5 | | 8055.5 | |

TABLE 5-continued

| Animal # | Time, Min | (−)-trans- CBD-PET-OH in plasma (ng/ml) | Average (ng/ml) |
|---|---|---|---|
| 6 | | 6839.5 | |
| 4 | 120 | 4285.2 | 3463.8 |
| 5 | | 2831.1 | |
| 6 | | 3274.9 | |

MES Study

Figure 4:
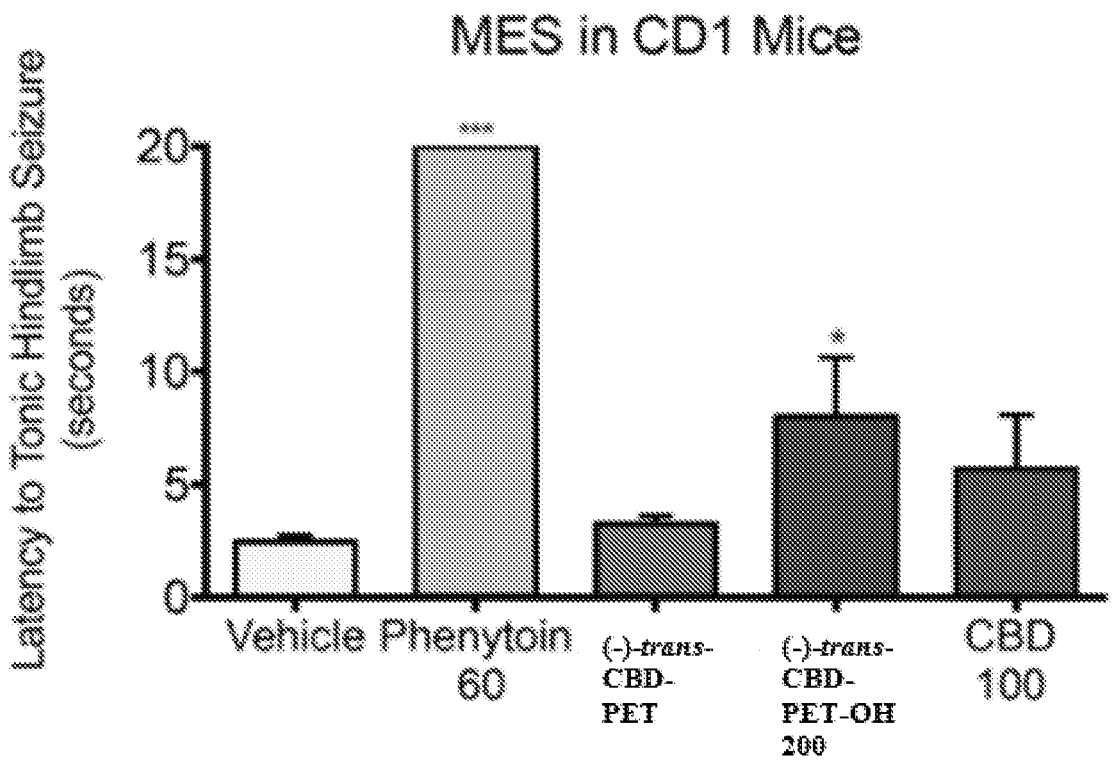
FIG. 4 is a bar chart showing latency to tonic hindlimb seizure for the test compounds vs CBD and a negative (vehicle) and positive control (phenytoin) in a MES mouse model of seizures.

The results of the MES study are illustrated in FIG. 4: MES: Latency in seconds for seizures to occur in mice. Animals received treatments according to Table 2. A 20 second timeout was recorded for any mouse that did not exhibit a tonic seizure. Data are expressed as the average ±SEM. Data were analysed by One-way ANOVA, followed by a post-hoc Fisher's LSD test. ***P<0.001, *P<0.05, n=1

PTZ Study

Figure 5:
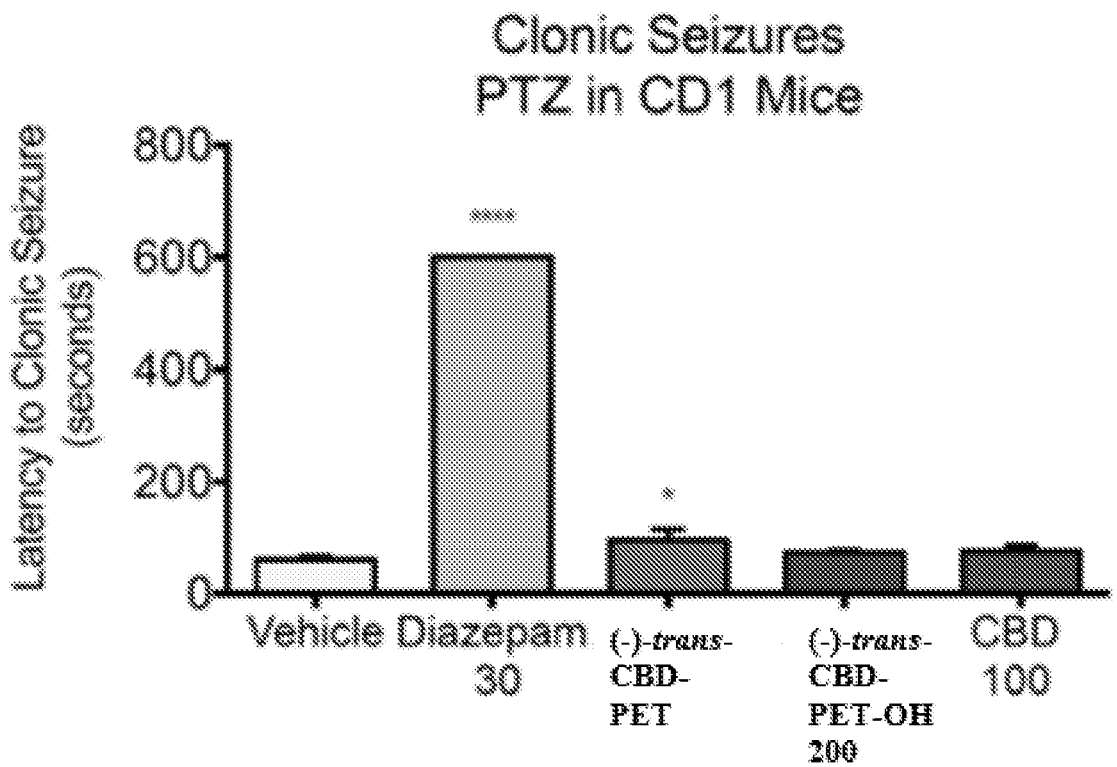
FIG. 5 is a bar chart showing latency to clonic seizure for the test compounds vs CBD and a negative (vehicle) and positive control (diazepam) in a PTZ mouse model of seizures.

The results of the PTZ study are illustrated in FIG. 5: PTZ: Latency to myoclonic seizure. Animals received treatments according to Table 3. Each bar graph represents the mean latency (seconds)+/−SEM. *P<0.05, ****P<0.0001, one-way ANOVA followed by a Fisher's LSD test, compared to vehicle treated animals, n=10/group.

Figure 6:
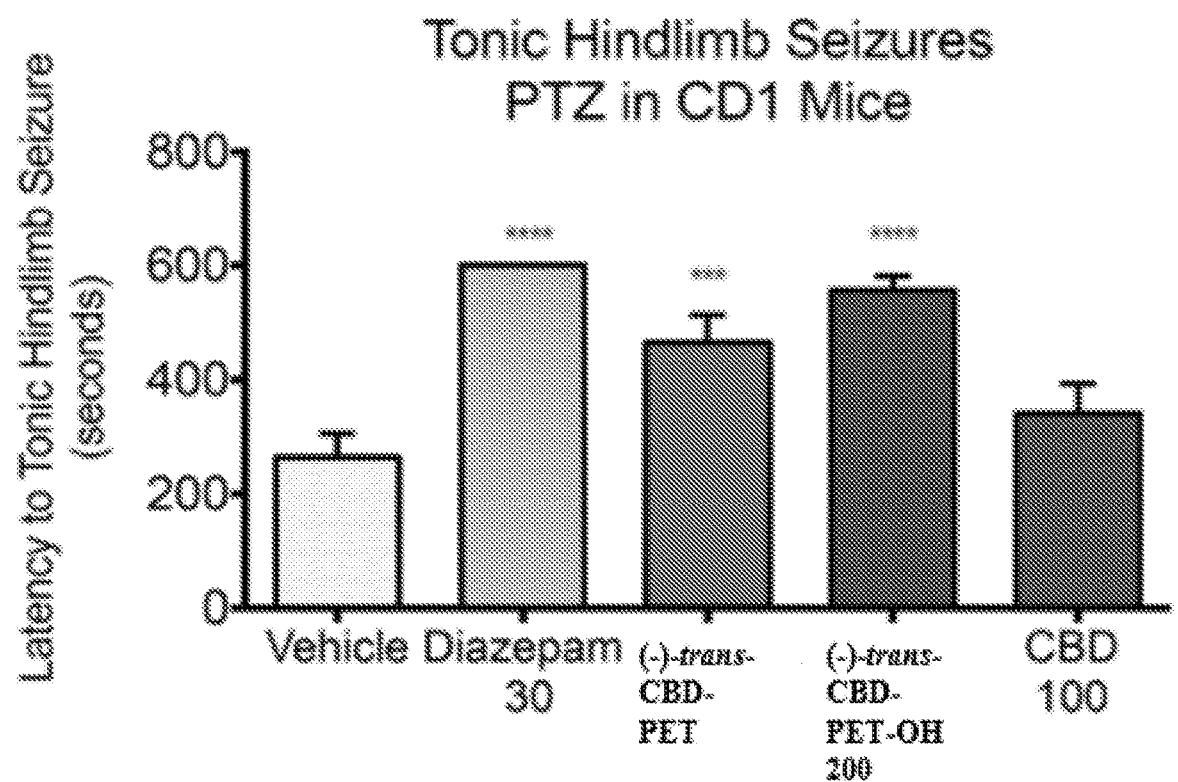
FIG. 6 is a bar chart showing latency to tonic hindlimb seizure for the test compounds vs CBD and a negative (vehicle) and positive control (diazepam) in a PTZ mouse model of seizures.

In FIG. 6: PTZ: Latency to tonic hindlimb seizure. Animals received treatments according to Table 3. Each bar graph represents the mean latency (seconds)+/−SEM. *P<0.001, *P<0.0001, one-way ANOVA followed by a Fisher's LSD test, compared to vehicle treated animals, n=10/group.

CONCLUSION

Pharmacokinetic time course analysis for (−)-trans CBD-PET and (−) trans CBD-PET-OH demonstrated that maximal concentration in plasma was achieved at 30 min after the injection. It was decided that pre-treatment time for (−)-trans CBD-PET and (−)-trans CBD-PET-OH for MES and PTZ studies was 30 min.

In the MES study, (−)-trans CBD-PET was inactive. (−)-trans CBD-PET-OH effect was significantly different from vehicle (p<0.05). Positive control for the study, phenytoin, demonstrated a 100% protection from the seizures (p<0.05).

Administration of PTZ produced clonic and tonic hindlimb seizures in animals treated with vehicle. A positive control for the study, diazepam, produced a significant protection from the seizures (100%, FIGS. 5 and 6, p<0.05).

Administration of (−)-trans CBD-PET produced a significant protection from clonic seizures (p<0.05) compared to the vehicle-treated animals.

Administration of (−)-trans CBD-PET and (−)-trans CBD-PET-OH produced a significant effect, protecting from tonic hindlimb seizures (p<0.05).

Cannabidiol at 100 mg/kg, administered at 60 min prior to MES and PTZ, did not produce a significant effect in the models (p>0.05).

The invention claimed is:

1. A compound, which is any one selected from the group consisting of:
(a) 4-(4-hydroxyphenethyl)-5'-methyl-2'-(prop-1-ene-2-yl)-1',2',3',4'-tetrahydro-[1,1'-biphenyl]-2,6-diol (CBD-PET-OH)

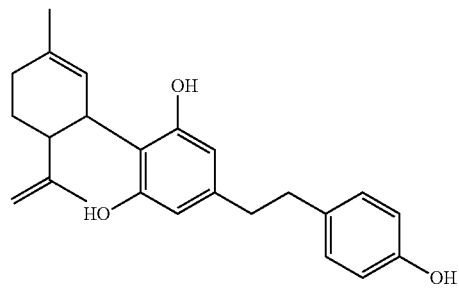 [SMILES: C=C(C)C1CCC(C)=CC1c1c(O)cc(CCc2ccc(O)cc2)cc1O]

and
(b) (1'R,2'R)-4-(4-hydroxyphenethyl)-5'-methyl-2'-(prop-1-ene-2-yl)-1',2',3',4'-tetrahydro-[1,1'-biphenyl]-2,6-diol ((−) trans-CBD-PET-OH)

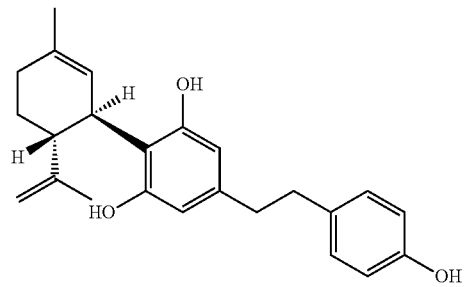 [SMILES: C=C(C)[C@@H]1CCC(C)=C[C@H]1c1c(O)cc(CCc2ccc(O)cc2)cc1O]

and
(c) compound (1'S,2'S)-4-(4-hydroxyphenethyl)-5'-methyl-2'-(prop-1-ene-2-yl)-1',2',3',4'-tetrahydro-[1,1'-biphenyl]-2,6-diol ((+) cis CBD-PET-OH)

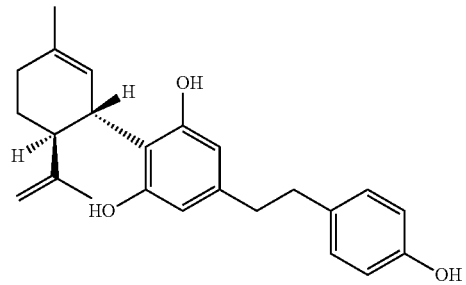 [SMILES: C=C(C)[C@H]1CCC(C)=C[C@@H]1c1c(O)cc(CCc2ccc(O)cc2)cc1O]

and
(d) (1'R,2'S)-4-(4-hydroxyphenethyl)-5'-methyl-2'-(prop-1-ene-2-yl)-1',2',3',4'-tetrahyrdo-[1,1'-biphenyl]-2,6-diol((−) cis- CBD-PET-OH)

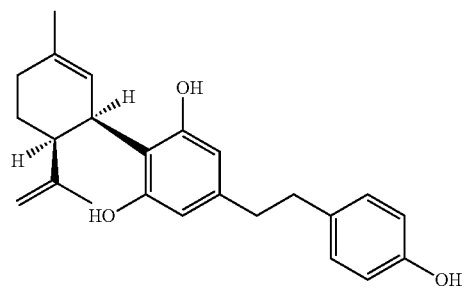 [SMILES: C=C(C)[C@H]1CCC(C)=C[C@H]1c1c(O)cc(CCc2ccc(O)cc2)cc1O]

(e) (1'S,2'R)-4-(4-hydroxyphenethyl)-5'-methyl-2'-(prop-1-ene-2-yl)-1',2',3',4'-tetrahydro-[1,1'-biphenyl]-2,6-diol ((+) cis CBD-PET-OH)

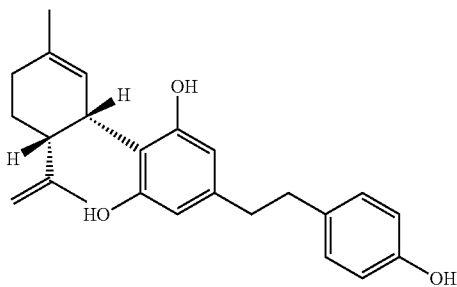 [SMILES: C=C(C)[C@@H]1CCC(C)=C[C@@H]1c1c(O)cc(CCc2ccc(O)cc2)cc1O]

and (f) an o-isomer of trans-CBD-PET-OH having a structure:

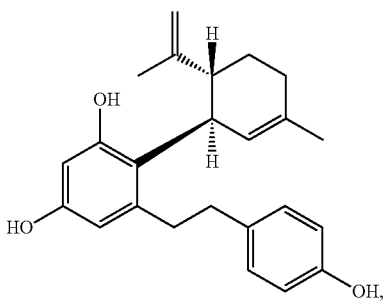

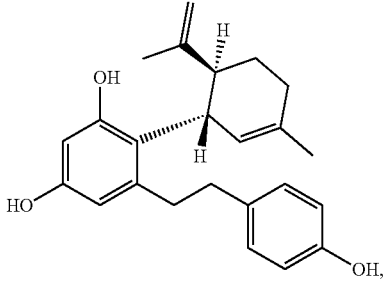

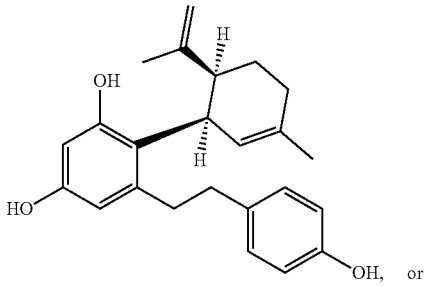

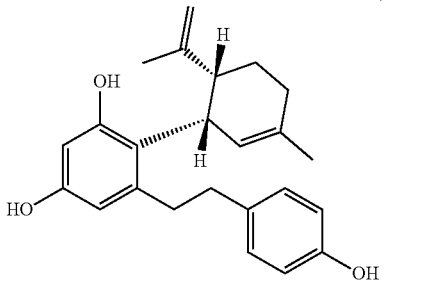

or a pharmaceutically acceptable salt or hydrate of one of (a) through (f) thereof.

2. The compound according to claim 1, wherein the compound is 4-(4-hydroxyphenethyl)-5'-methyl-2'-(prop-1-ene-2-yl)-1',2',3',4'-tetrahydro-[1,1'-biphenyl]-2,6-diol (CBD-PET-OH)

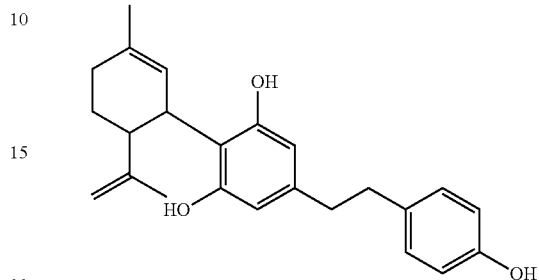

or a pharmaceutically acceptable salt or hydrate thereof.

3. The compound according to claim 1, wherein the compound is (1'R,2'R)-4-(4-hydroxyphenethyl)-5'-methyl-2'-(prop-1-ene-2-yl)-1',2',3',4'-tetrahydro-[1,1'-biphenyl]-2,6-diol ((−) trans-CBD-PET-OH)

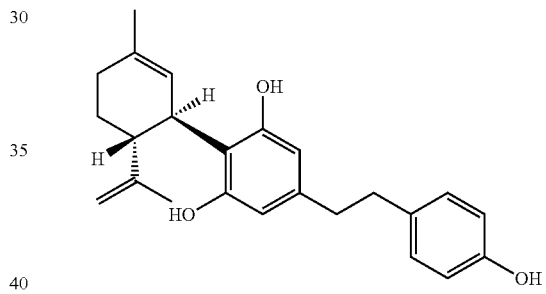

or a pharmaceutically acceptable salt or hydrate thereof.

4. The compound according to claim 1, wherein the compound is (1'S,2'S)-4-(4-hydroxyphenethyl)-5'-methyl-2'-(prop-1-ene-2-yl)-1',2',3',4'-tetrahydro-[1,1'-biphenyl]-2,6-diol ((+) cis CBD-PET-OH)

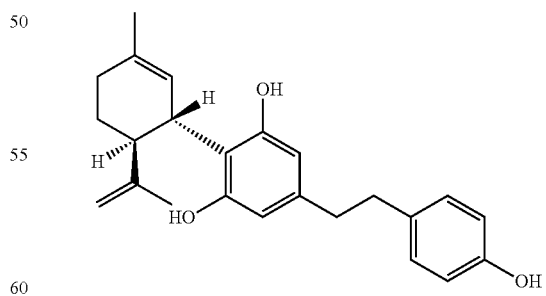

or a pharmaceutically acceptable salt or hydrate thereof.

5. The compound according to claim 1, wherein the compound is (1'R,2'S)-4-(4-hydroxyphenethyl)-5'-methyl-2'-(prop-1-ene-2-yl)-1',2',3',4'-tetrahydro-[1,1'-biphenyl]-2,6-diol ((−) cis-CBD-PET-OH)

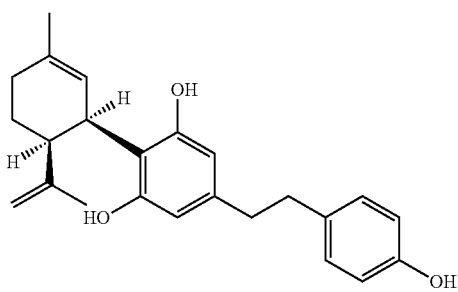 [SMILES: C=C(C)[C@H]1CCC(C)=C[C@H]1c1c(O)cc(CCc2ccc(O)cc2)cc1O]

or a pharmaceutically acceptable salt or hydrate thereof.

6. The compound according to claim 1, wherein the compound is (1'S,2'R)-4-(4-hydroxyphenethyl)-5'-methyl-2'-(prop-1-ene-2-yl)-1',2',3',4'-tetrahydro-[1,1'-biphenyl]-2,6-diol ((+) cis CBD-PET-OH)

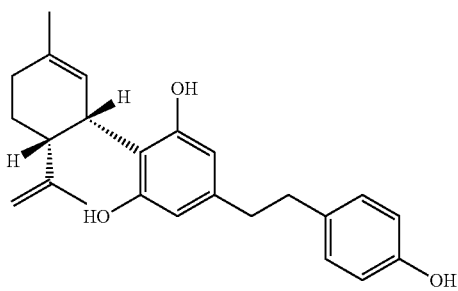 [SMILES: C=C(C)[C@@H]1CCC(C)=C[C@@H]1c1c(O)cc(CCc2ccc(O)cc2)cc1O]

or a pharmaceutically acceptable salt or hydrate thereof.

7. The compound according to claim 1, wherein the compound is an o-isomer of trans-CBD-PET-OH having a structure:

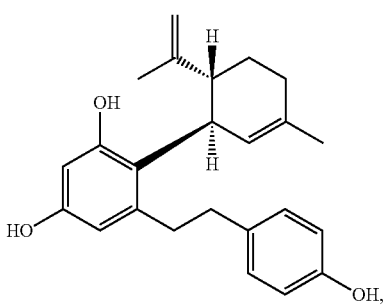

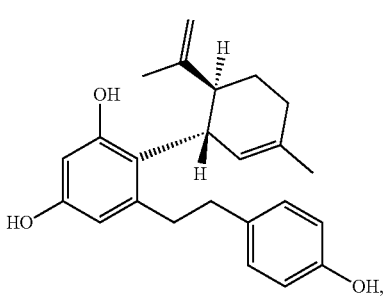

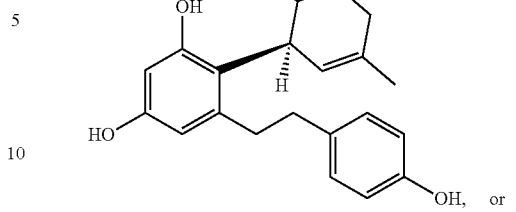

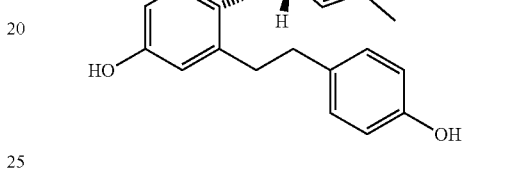

or a pharmaceutically acceptable salt or hydrate thereof.

8. The compound according to claim 1, which is present as an isomer with a purity of at least 90%.

9. The compound according to claim 1, which is present as a racemic mix of a respective (+) or (−) trans or (+) or (−) cis form.

10. The compound according to claim 1, which is a p isomer with a purity of at least 90%.

11. The compound of claim 1, which is a o isomer with a purity of at least 90%.

12. The compound of claim 10, wherein the isomer is at greater than 95% purity.

13. The compound according to claim 1, which is a mixture of both p and o isomers.

14. The compound of claim 13, wherein the two isomers forming the mixture are together present at greater than 95% purity.

15. A method for treating a condition, which is seizure or epilepsy in a patient, comprising administering to the patient a therapeutically effective amount of a compound according to claim 1 or 5'-methyl-4-phenethyl-2'-(prop-1-ene-2-yl)-1',2',3',4'-tetrahydro-[1,1'-biphenyl]-2,6-diol having the following structure

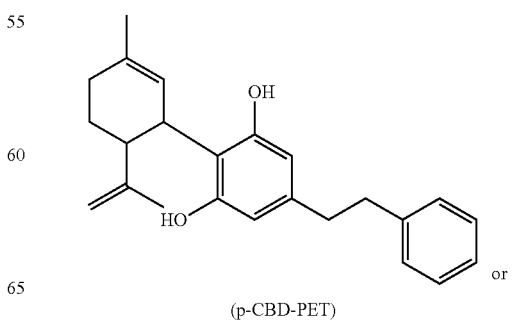

(p-CBD-PET)

-continued

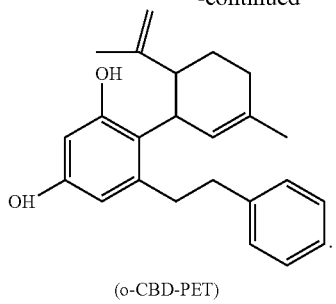

(o-CBD-PET)

16. The method according to claim 15, wherein the condition to be treated is generalised epilepsy.

17. The method according to claim 15, wherein the condition to be treated is myoclonic seizure.

18. The method according to claim 15, wherein the condition to be treated is Juvenile myoclonic epilepsy, Lennox-Gastaut syndrome and/or Progressive myoclonic epilepsy.

19. The method according to claim 15, wherein the condition to be treated is a clonic seizure, tonic seizure and/or tonic-clonic seizure.

20. The method according to claim 15, wherein the compound is packaged for delivery or delivered at an effective dose through one of the following routes: parenteral, oral, nasal including nasogastric, ocular, transmucosal ortransdermal.

21. The method according to claim 15, wherein the patient is a human patient.

22. The method according to claim 15, wherein the compound is administered to the patient at a dose of at least 8 mg/Kg.

* * * * *